(12) United States Patent
Xiong et al.

(10) Patent No.: US 11,165,064 B2
(45) Date of Patent: Nov. 2, 2021

(54) LI-SUBSTITUTED LAYERED SPINEL CATHODE MATERIALS FOR SODIUM ION BATTERIES

(71) Applicant: BOISE STATE UNIVERSITY, Boise, ID (US)

(72) Inventors: Hui Xiong, Boise, ID (US); Changjian Deng, Boise, ID (US); Jing Xu, Mountain View, CA (US)

(73) Assignee: Boise State University, Boise, ID (US)

( * ) Notice: Subject to any disclaimer, the term of this patent is extended or adjusted under 35 U.S.C. 154(b) by 0 days.

(21) Appl. No.: 16/594,235

(22) Filed: Oct. 7, 2019

(65) Prior Publication Data

US 2021/0104742 A1   Apr. 8, 2021

(51) Int. Cl.
*H01M 4/525* (2010.01)
*H01M 10/054* (2010.01)
*H01M 4/505* (2010.01)
*C01G 53/00* (2006.01)
*H01M 4/02* (2006.01)

(52) U.S. Cl.
CPC ............ *H01M 4/525* (2013.01); *C01G 53/50* (2013.01); *H01M 4/505* (2013.01); *H01M 10/054* (2013.01); *C01P 2002/01* (2013.01); *C01P 2002/72* (2013.01); *C01P 2004/03* (2013.01); *C01P 2006/40* (2013.01); *H01M 2004/028* (2013.01)

(58) Field of Classification Search
CPC .... H01M 4/525; H01M 10/054; H01M 4/505; H01M 2004/028; C01G 53/50; C01P 2006/40; C01P 2002/01; C01P 2002/72; C01P 2004/03
See application file for complete search history.

(56) References Cited

U.S. PATENT DOCUMENTS

2012/0183837 A1* 7/2012 Johnson ................ H01M 4/502
                                                                 429/156
2016/0181607 A1* 6/2016 Kendrick ............... C01G 53/50
                                                                 252/182.1

* cited by examiner

*Primary Examiner* — Andrew J. Oyer
(74) *Attorney, Agent, or Firm* — Parsons Behle & Latimer

(57) ABSTRACT

Systems, methods, and compositions are disclosed for a Li-substituted layered-tunneled O3/spinel Na(Ni$_x$Fe$_y$Mn$_z$)O$_2$ cathode material, Na$_{0.87}$Li$_{0.25}$Ni$_{0.4}$Fe$_{0.2}$Mn$_{0.4}$O$_{2+\delta}$ (LS-NFM) for enhanced sodium ion storage and cycling stability. The LS-NFM electrode is prepared by adjusting the stoichiometric ratio of the Na ion over the sum of Li and transition metal ions below 1. The Rietveld refinement of XRD data indicates that the cathode is composed of 94% layered and 6% spinel components. When cycled at a high current density of 100 mA g$^{-1}$, LS-NFM cathode exhibited a first-cycle Coulombic efficiency of 88% and reversible discharge capacity of 107 mAh g$^{-1}$ after 50 cycles with the capacity retention of 95%.

3 Claims, 15 Drawing Sheets

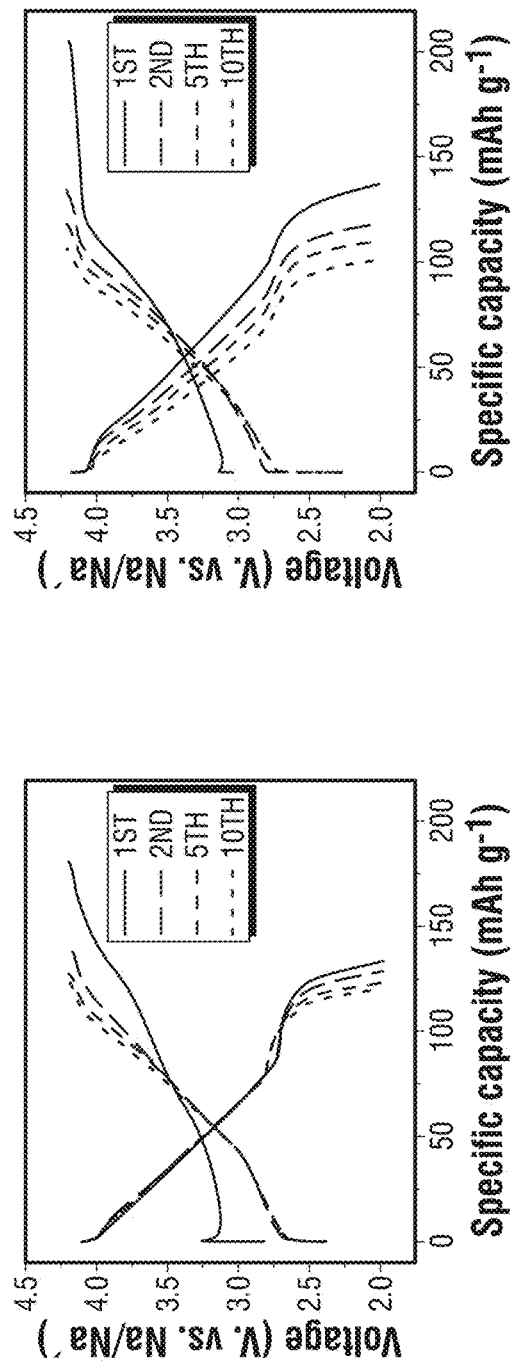
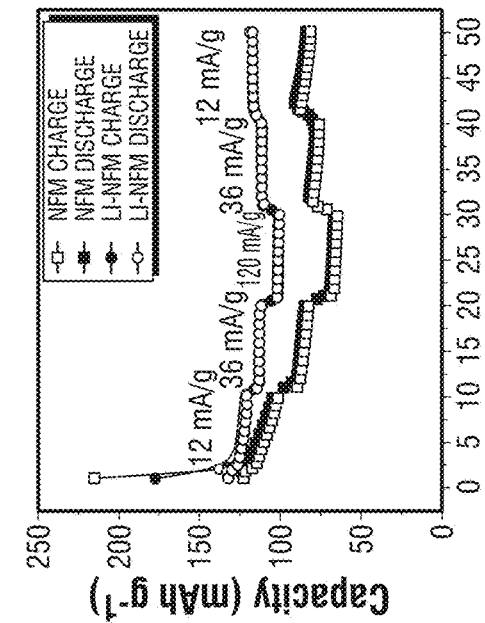
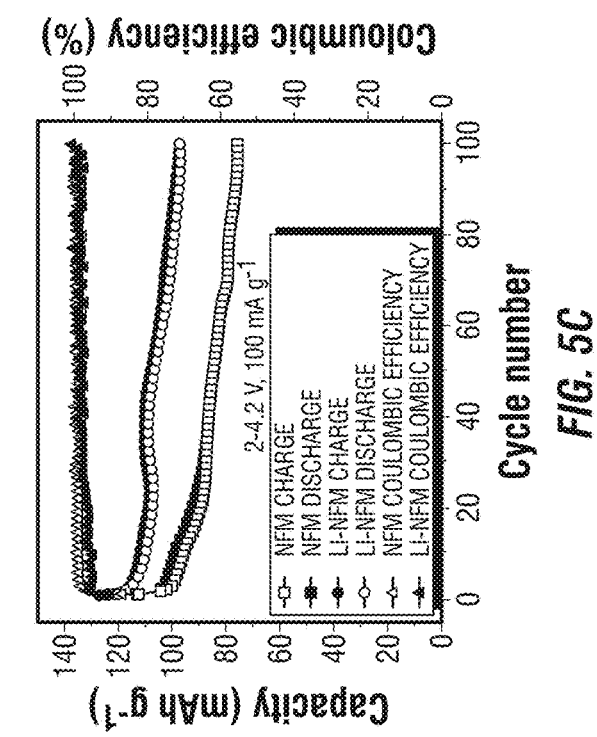
FIG. 5A  FIG. 5B  FIG. 5C  FIG. 5D

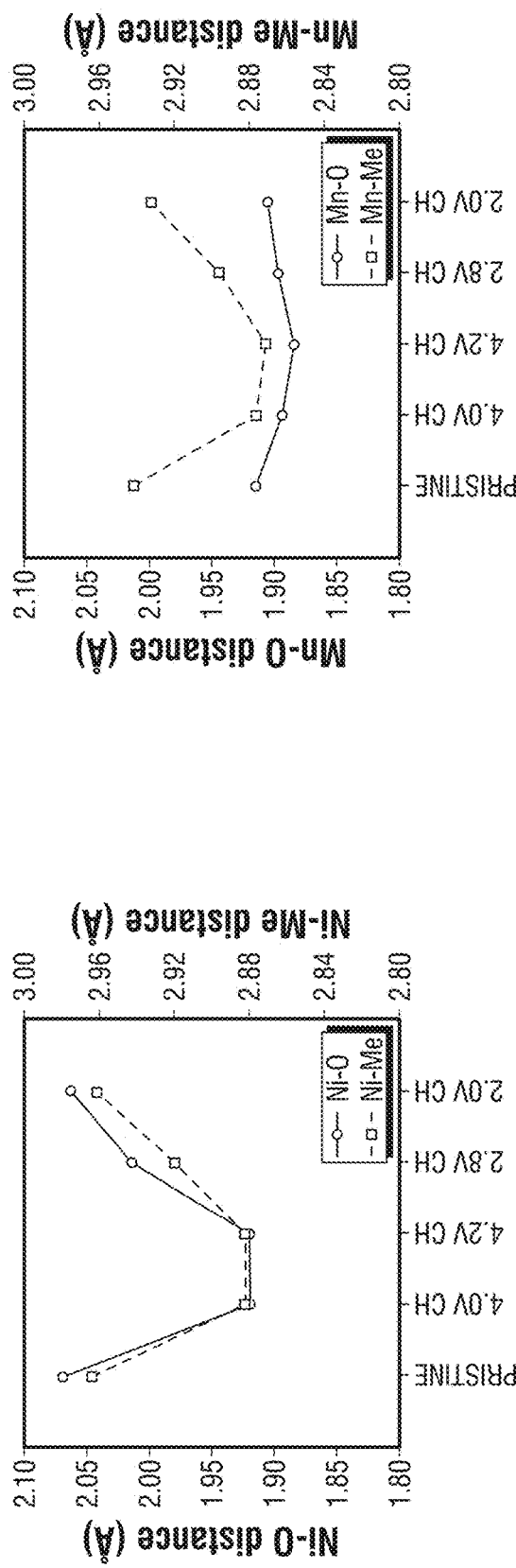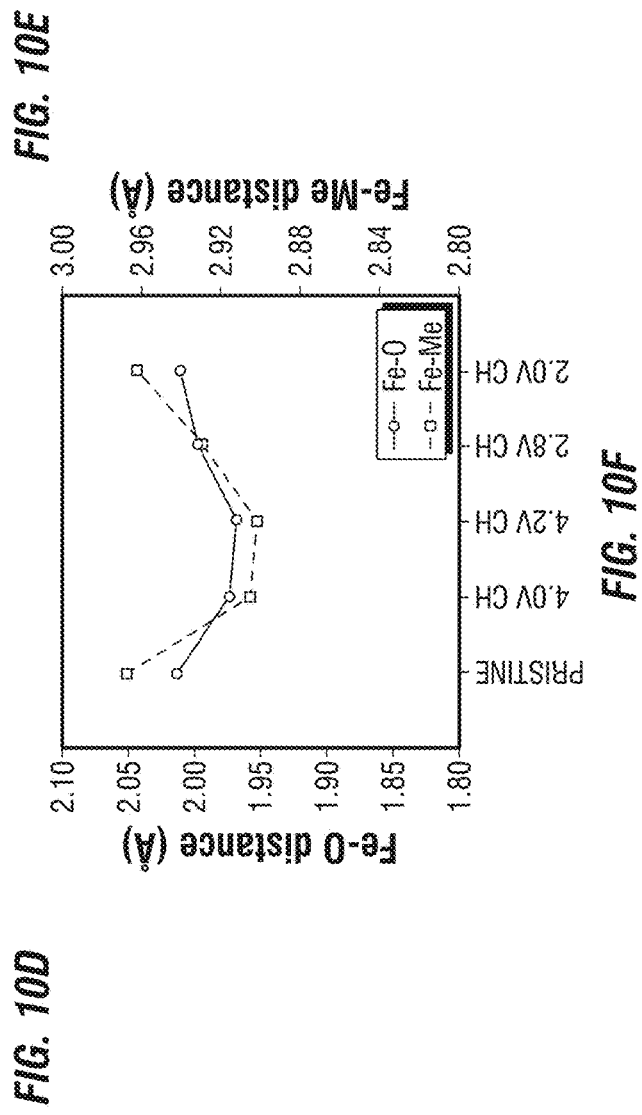
FIG. 10D
FIG. 10E
FIG. 10F

LI-SUBSTITUTED LAYERED SPINEL CATHODE MATERIALS FOR SODIUM ION BATTERIES

GOVERNMENT LICENSE RIGHTS

This invention was made with government support under DOE Grant No. DE-SC0019121 awarded by the U.S. Department of Energy. The government has certain rights in the invention.

FIELD OF THE DISCLOSURE

This disclosure relates generally to cathodes for batteries. In particular, this disclosure relates to systems and methods for the synthesis of mixed-phased layered-spinel cathode materials for sodium-ion batteries.

BACKGROUND

Because of the high abundance and low cost of sodium, a sodium ion battery (SIB) has been considered as an attractive technology for the next-generation, large-scale energy storage systems (EES) in support of reliable, robust and cost-effective electrical power grids using renewable energy sources such as solar and wind. Although the energy/power density of SIBs may not exceed those of the current leading lithium-ion battery (LIB) technology due to the heavier atomic weight and larger ionic size of sodium (Na) compared with lithium (Li), the wide and abundant natural reserve of sodium raw materials contrasts the limited, and more costly, Li-based minerals. Owing to their relatively high capacity from the closed packed structure, layered sodium transition metal oxides $Na_xTMO_2$ ($x \le 1$, TM=transition metal) have received the most attention for research and development. Layered $Na_xTMO_2$ prefer O3-type stacking sequence at high Na contents (e.g., x~0.9-1.0). Among O3-type layered oxides, $Na(Ni_xFe_yMn_z)O_2$ cathode is of great interest due to the utilization of cheap, abundant and environmentally friendly transition metals of Fe and Mn, as well as significant improvement in stability and energy density compared with the $NaFeO_2$ cathode. The ternary Fe-substituted O3-$Na(Ni_{1/3}Fe_{1/3}Mn_{1/3})O_2$ cathode was first introduced by Kim, et al., with a reversible capacity of 100 mA h g$^{-1}$ for 150 cycles (1.5-4.0 V). See, D. Kim, S. H. Kang, M. Slater, S. Rood, J. T. Vaughey, N. Karan, M. Balasubramanian, C. S. Johnson, "Enabling Sodium Batteries Using Lithium-Substituted Sodium Layered Transition Metal Oxide Cathodes", *Adv. Energy Mater,* 1 (2011) 333-336. Since then systematic studies with various Fe substitutions in ternary O3-type materials were conducted by Yabuuchi, et al., and Ding, et al., exhibiting ~130 mAh g$^{-1}$ reversible capacity for Fe=0.4 and Fe=0.2, respectively. See, Yabuuchi, N.; Yano, M.; Yoshida, H.; Kuze, S.; Komaba, S., "Synthesis and Electrode Performance of O3-Type $NaFeO_2$—$NaNi_{1/2}Mn_{1/2}O_2$ Solid Solution for Rechargeable Sodium Batteries" *J. Electrochem. Soc.,* 2013, 160, (5), A3131-A3137; and Yuan, D. D.; Wang, Y. X.; Cao, Y. L.; Ai, X. P.; Yang, H. X., "Improved Electrochemical Performance of Fe-Substituted $NaNi_{0.5}Mn_{0.5}O_2$ Cathode Materials for Sodium-Ion Batteries," *Acs. Appl. Mater. Inter.,* 2015, 7, (16), 8585-8591. Moreover, large-scale synthesis of $Na(Ni_{1/3}Fe_{1/3}Mn_{1/3})O_2$ has been achieved in a pouch cell, showing capacity retention of 73% after 500 cycles.

Although the technology of O3-type layered cathodes for SIBs has rapidly developed, the cycling stability of such materials especially at high voltages (above 4.0 V vs. Na/Na$^+$) remains an issue. The Na$^+$/vacancy ordering in O3 structures triggers the phase transitions by the gliding of $TMO_2$ layers through vector (⅓, ⅔, 0) without breaking TM-O bonds. With partial extraction of Na ions during charging process, the O3 structure gradually transforms to the P3 structure; namely, Na ions are located at prismatic sites with a stacking sequence of AB-BC-CA. It was found that phase transition in O3-type layered cathodes plays a crucial role in their charge storage property and cycling stability. Particularly, the existence or reversibility of the phase transitions directly affects the stability of materials during Na insertion and extraction. Recently, several groups have reported that the overall electrochemical performance of O3-type layered cathodes can be enhanced by lithium substitution.

When Li ions are introduced to the O3-type layered cathodes, Li ions are thermodynamically favored at the transition metal sites due to the similarity of its ionic radii (0.76 Å) to that of the transition metals (~0.5-0.7 Å). Therefore, the traditional design strategy of Li-substituted layered cathodes follows the rule that the stoichiometric ratio of Na over the sum of transition metals and Li equals 1, so that the as-prepared cathodes maintain pure layered structures. Investigations of $NaLi_xNi_{1/3-x}Mn_{1/3+x}Co_{1/3-x}O_2$ (x=0.07, 0.13, and 0.2) and the optimal performance was obtained by x=0.07 with high reversible capacity of 147 mAh g$^{-1}$ and excellent rate capability. See, Xu, J.; Liu, H. D.; Meng, Y. S., "Exploring Li substituted O3-structured layered oxides $NaLi_xNi_{1/3-x}M_{1/3+x}Co_{1/3-x}O_2$ (x'-=0.07, 0.13, and 0.2) as promising cathode materials for rechargeable Na batteries," *Electrochem. Commun.* 2015, 60, 13-16. The ex situ synchrotron X-ray diffraction (XRD) suggested that the O3 phase is maintained upon cycling, leading to good capacity retention and excellent rate performance. There have also been reports of O3-type Na—[$Li_{0.05}$($Ni_{0.25}Fe_{0.25}Mn_{0.5}$)$_{0.95}$]$O_2$ cathode with improved capacity retention and structural stability. See, Oh, S. M.; Myung, S. T.; Hwang, J. Y; Scrosati, B.; Amine, K.; Sun, Y. K., "High Capacity O3-Type Na[$Li_{0.05}$($Ni_{0.25}Fe_{0.25}Mn_{0.5}$)$_{0.95}$]$O_2$ Cathode for Sodium Ion Batteries," *Chem. Mater.* 2014, 26, (21), 6165-6171. The XRD results suggested that the phase transition from hexagonal O3 to monoclinic P'3 was delayed in Li substituted cathode, leading to an enhanced stability.

In addition to the pure Li-substituted O3-type layered cathodes, studies have varied the Li content and obtained the layered P2/O3 intergrowth cathode that exhibited a synergistic effect to improve Na$^+$ diffusion for high rate performance. See, Lee, E.; Lu, J.; Ren, Y; Luo, X. Y; Zhang, X. Y.; Wen, J. G.; Miller, D.; DeWahl, A.; Hackney, S.; Key, B.; Kim, D.; Slater, M. D.; Johnson, C. S., "Layered P2/O3 Intergrowth Cathode: Toward High Power Na-Ion Batteries," *Adv. Energy Mater.,* 2014, 4, (17), 1400458. Intergrowth electrode materials have also been studied by other groups. For example, groups have prepared stable layered P3/P2 $Na_{0.66}Co_{0.5}Mn_{0.5}O_2$ cathode materials with outstanding structural flexibility and electrochemical performance. See, Chen, X. Q.; Zhou, X. L.; Hu, M.; Liang, J.; Wu, D. H.; Wei, J. P.; Zhou, Z., "Stable layered P3/P2 $Na_{0.66}Co_{0.5}Mn_{0.5}O_2$ cathode materials for sodium-ion batteries," *J. Mater. Chem. A* 2015, 3, (41), 20708-20714. Other groups have demonstrated that $NaLi_{0.1}Ni_{0.35}Mn_{0.55}O_2$ exhibited O3/O'3 structure and the presence of O'3 phase, originating from Li substitution, hindered the O3-P3 phase transformation, thus improving capacity retention, such that 85% of capacity was maintained after 100 cycles. See, Zheng, S. Y; Zhong, G. M.; McDonald, M. J.; Gong, Z. L.; Liu, R.; Wen, W.; Yang, C.; Yang, Y, "Exploring the working mechanism of Li$^+$ in O3-type NaLi$_{0.1}$Ni$_{0.35}$Mn$_{0.55}$O$_2$ cathode materials for rechargeable Na-ion batteries," *J. Mater. Chem. A,* 2016, 4, (23), 9054-9062. Groups have also prepared layered P2-O3 Na$_{2/3}$Li$_{0.18}$Mn$_{0.8}$Fe$_{0.2}$O$_2$ cathode derived from earth abundant elements, where the electrode delivered a capacity of 125 and 105 mA h g$^{-1}$ at C/10 and 1C rates, respectively, with a Coulombic efficiency of 95%-99.9% over 100 cycles. See, Bianchini, M.; Gonzalo, E.; Drewett, N. E.; Ortiz-Vitoriano, N.; del Amo, J. M. L.; Bonilla, F. J.; Acebedo, B.; Rojo, T., "Layered P2-O3 sodium-ion cathodes derived from earth abundant elements," *J. Mater. Chem. A,* 2018, 6, (8), 3552-3559.

Aside from the layered intergrowth cathodes, some have reported a novel design of mixed layered-tunneled P2+T phase Na$_x$Co$_{0.1}$Mn$_{0.9}$O$_2$ (0.44≤x≤0.7) with interface-rich characteristic for high performance sodium storage, whereby the tunneled T phase offers fast Na ion diffusivity and excellent structural stability and the layered P2 phase contributes to high specific capacity. See, Gao, G.; Tie, D.; Ma, H.; Yu, H.; Shi, S.; Wang, B.; Xu, S.; Wang, L.; Zhao, Y., "Interface-rich mixed P2+T phase Na$_x$Co$_{0.1}$Mn$_{0.9}$O$_2$ (0.44≤x≤0.7) toward fast and high capacity sodium storage," *J. Mater. Chem. A,* 2018, 6, (15), 6675-6684. In addition, the P2-T interface offers additional channels and active sites for charge storage and transfer. The specific capacity, structural stability, rate capability and Na ion diffusivity were significantly improved in the P2+T phase cathode compared with single P2 or T phase cathodes. Id.

In addition to T phase, the postspinel NaMn$_2$O$_4$ cathode material with tunneled structure showed high structural stability and Na mobility for sodium ion batteries based on both computational and experimental studies. The postspinel NaMn$_2$O$_4$ was prepared under high pressure and it exhibited 94% capacity retention after 200 cycles. The stable cycling performance was attributed to the suppression of the Jahn-Teller distortion due to the high barrier of structural rearrangement of MnO$_6$ octahedrons.

SUMMARY

Accordingly, disclosed embodiments address the above and other issues with existing systems and methods. Inspired by the advantages of O3-Na(Ni$_x$Fe$_y$Mn$_z$)O$_2$ cathode materials, the design strategies of Li substitution, layered-tunneled intergrown phases and tunneled spinel phase with improved structural stability and Na mobility, we disclose here a Li-substituted layered-tunneled O3/spinel Na(Ni$_x$Fe$_y$Mn$_z$)O$_2$ cathode material, Na$_{0.87}$Li$_{0.25}$Ni$_{0.4}$Fe$_{0.2}$Mn$_{0.4}$O$_{2+\delta}$ (LS-NFM) for enhanced sodium ion storage and cycling stability. The LS-NFM electrode was prepared by adjusting the stoichiometric ratio of the Na ion over the sum of Li and transition metal ions below 1. The Rietveld refinement of XRD data indicated that the cathode is composed of 94% layered and 6% spinel components. The great structural compatibility and connectivity of the two phases are confirmed by XRD, selected area electron diffraction (SAED) and high-resolution transmission electron microscopy (HRTEM). The galvanostatic intermittent titration (GITT) analysis suggested that the Na ion diffusivity of LSNFM has significantly improved compared to the pure-phased un-doped NFM control. When cycled at a high current density of 100 mA g$^{-1}$, LS-NFM cathode exhibited a first-cycle Coulombic efficiency of 88% and reversible discharge capacity of 107 mAh g$^{-1}$ after 50 cycles with the capacity retention of 95%. Structural characterization by ex situ soft and hard x-ray absorption spectroscopy (XAS) suggested that the capacity of LSNFM largely resulted from the N$^{2+}$/Ni$^{4+}$ redox couple and slightly from Fe$^{3+}$/Fe$^{4+}$ redox couple.

Disclosed embodiments include methods for making a cathode material for a SIB, the method including synthesizing a co-precipitated precursor by dissolving stoichiometric amounts of NiSO$_4$.6H$_2$O, FeSO$_4$.7H$_2$O, and MnSO$_4$.H$_2$O in water to form a first solution. Adding the first solution into a Na$_2$C$_2$O$_4$ solution to form a second solution. Maintaining the second solution at a substantially constant temperature for a predetermined time period. Filtering the second solution to collect a precipitate. Washing the precipitate and drying the precipitate to form the co-precipitated precursor. Reacting the co-precipitated precursor comprising (Ni$_{0.4}$Fe$_{0.2}$Mn$_{0.4}$)C$_2$O$_4$, with Li$_2$CO$_3$ and Na$_2$CO$_3$ to form a precursor powder. Grinding the precursor powder together with stoichiometric amounts of Li$_2$CO$_3$ and Na$_2$CO$_3$ to form a combined powder. Pressing the combined powered into pellets and heating the pellets to form the cathode material.

In some embodiments the substantially constant temperature that the second solution is maintained at is substantially 70° C. and the predetermined time period is substantially 3 hours.

In some embodiments, the step of drying the precipitate includes drying in air at substantially 105° C.

In some embodiments the step of grinding the precursor powder further includes grinding for substantially one hour.

In some embodiments, the step of heating the pellets further includes heating at substantially 500° C. for 8 hours and then heating at substantially 800° C. for an additional 8 hours.

Disclosed embodiments also include a cathode material for a SIB having Na$_{0.87}$Li$_{0.25}$Ni$_{0.4}$Fe$_{0.2}$Mn$_{0.4}$O$_{2+\delta}$ (LS-NFM). Embodiments of the cathode material have substantially 94% layered components and substantially 6% spinel components. Still further embodiments of the cathode material have a first-cycle Coulombic efficiency of 88% and a reversible discharge capacity of 107 mAh g–1 after 50 cycles with the capacity retention of 95% when cycled at a high current density of 100 mA g$^{-1}$. Other embodiments also exist.

BRIEF DESCRIPTION OF THE DRAWINGS

FIGS. 5A-5B respectively show the voltage profiles of LS-NFM and NFM electrodes cycled with a potential window of 2-4.2 V at 12 mA g$^{-1}$ in accordance with disclosed embodiments.

FIGS. 5C-5D respectively show the (C) cycling performance and (D) rate capability of LS-NFM and NFM cathode materials in accordance with disclosed embodiments.

FIGS. 10D-10F show simulated TM-TM and TM-O distances of (D) Ni, (E) Mn, (F) Fe in accordance with disclosed embodiments.

Figure 1A:
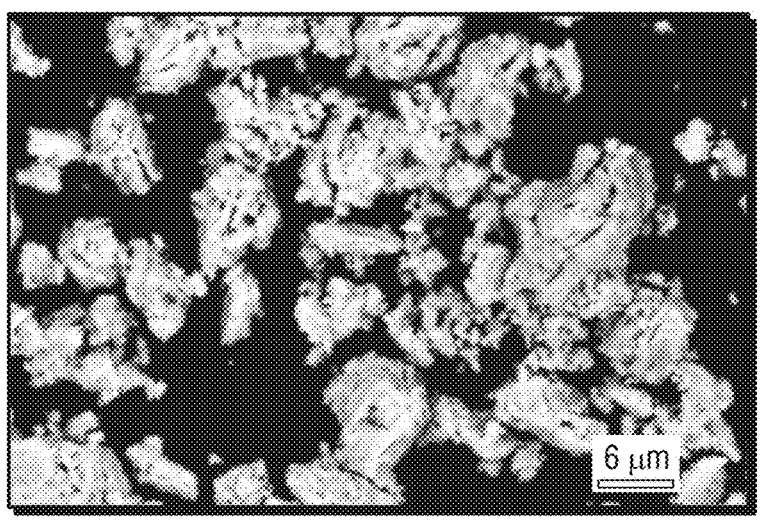
FIGS. 1A-1C are scanning electron microscope (SEM) images of a LS-NFM electrode in accordance with disclosed embodiments.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

Materials Synthesis. All of the chemicals were purchased from Sigma-Aldrich, (purity≥99%). LS-NFM was prepared by a solid state reaction of the co-precipitated precursor $(Ni_{0.4}Fe_{0.2}Mn_{0.4})C_2O_4$, $Li_2CO_3$ and $Na_2CO_3$. For precursor synthesis, the stoichiometric amount of $NiSO_4.6H_2O$, $FeSO_4.7H_2O$, $MnSO_4.H_2O$ was dissolved in water and then added into the $Na_2C_2O_4$ solution. The solution was then kept at 70° C. for 3 hours under stirring in air, and the resultant powder was filtered, washed, and dried in air at 105° C. The as-prepared precursor powder was grinded together with stoichiometric amounts of $Li_2CO_3$ and $Na_2CO_3$ for one hour and then pressed into pellets. The pellets were heated at 500° C. for 8 hours followed by 800° C. for 8 hours in the tube furnace with the flow of mixed oxygen/Argon gas (O2: Ar=1:4 v/v). Undoped $NaNi_{0.4}Fe_{0.2}Mn_{0.4}O_2$ (NFM) was also prepared by a solid state reaction of co-precipitated precursor $Ni_{1/2}Mn_{1/2}(OH)_2$, $Fe_2O_3$, and $Na_2CO_3$ for comparison. The stoichiometric amounts of chemicals were grinded for one hour and then pressed into pellets. The pellets were heated at 800° C. for 24 hours in air. Both cathodes were transferred into glove box immediately to avoid contact with moisture in the air.

Structural Characterizations. XRD patterns were obtained by a Rigaku Mini flex 600 with Cu Kα radiation (λ=1.5418 Å), and powder samples were tested in a flat sample stage and scanned from 5° to 120° (2θ) at the rate of 0.8°/min and 0.01°/step. Then the structure was analyzed by General Structure Analysis System (GSAS) package. The cycled laminated electrodes were scanned in the range of 10°-80° (2θ). The morphology of LS-NFM sample was characterized by a field-emission scanning electron microscope (FESEM, FEI Teneo) at an accelerating voltage of 15 kV. The TEM images were acquired by a JEOL 2100F with the accelerating voltage of 200 kV. TEM specimens of cycled samples were prepared in an Ar-filled dry glovebox ($O_2$<0.5 ppm). A Gatan vacuum transfer holder was employed to transfer the specimen from the glovebox to the microscope directly without exposure to air. The soft X-ray adsorption spectroscopy (XAS) measurements were performed at beamline 8-2 at the Stanford Synchrotron Radiation Lightsource (SSRL). Data were acquired under ultrahigh vacuum ($10^{-9}$ Torr) conditions in a single load at room temperature, using total electron yield (TEY) via the drain current. Hard XAS measurements for the Ni, Fe, and Mn K-edge were performed at the Advanced Photon Source on beamline 5-BM-D in transmission mode. All the ex situ samples were harvested from the cycled cells, cleaned, and sealed with Kapton tape in Ar-filled dry glovebox. The samples were subjected to the measurements immediately after they were taken out from sealed containers. Extended X-ray absorption fined structure (EXAFS) data processing and analysis were performed using the IFEFFIT package. The normalized EXAFS spectra were converted from energy to wave vector k and then weighted by $k^3$. The coordination number was fixed as 6 for the first shell transition metal-oxygen (TM-O), and 6 for the second-shell transition metal-transition metal (TM-TM).

Electrochemical Characterizations. Both LS-NFM and NFM laminated electrodes were prepared by mixing 80% active materials, 10% super carbon C45 (Timcal America Inc.) and 10% poly-(vinylidene fluoride) (PVDF), and screen-printed on an aluminum current collector. The electrode was punched into 1.5 cm diameter discs using Precision Disc Cutter (MTI) with a loading density of ~2.7 mg $cm^{-2}$. The half-cells were prepared with LS-NFM or NFM cathode electrodes, glass fiber separators (Celgard) and sodium counter electrode in an electrolyte of 1 M $NaPF_6$ in propylene carbonate (PC). Both cathodes were cycled on an Arbin battery tester with the potential window of 2-4.2 V. GITT was conducted on a Maccor battery tester with the cell charged at 12 mA $g^{-1}$ for a pulse of 30 min followed by a relaxation of 12 h to approach the steady state value where the voltage variation is <3 $mV^{-1}$. All of the samples were precycled prior to GITT measurements.

Results and Discussion. The LS-NFM is designed such that a mixed-phased O3/spinel structure can be formed. Specifically, the ratio between Na ion over the sum of Li and transition metal ions is adjusted to be below 1 as it has been shown that O3 phase may not form at high Na content. In addition, the separate spinel phase is more favorable over the pure layered phase when the Li content is high. However, if the Li content is too high, it can lead to P2 phase evolution. At the same time, we also need to consider that there are limited cation sites in the structure but sufficient Na source should be put to provide high capacity. Therefore, the final composition was designed as $Na_{0.87}Li_{0.25}Ni_{0.4}Fe_{0.2}Mn_{0.4}O_{2+\delta}$ which was confirmed by ICP-MS.

Figure 1B:
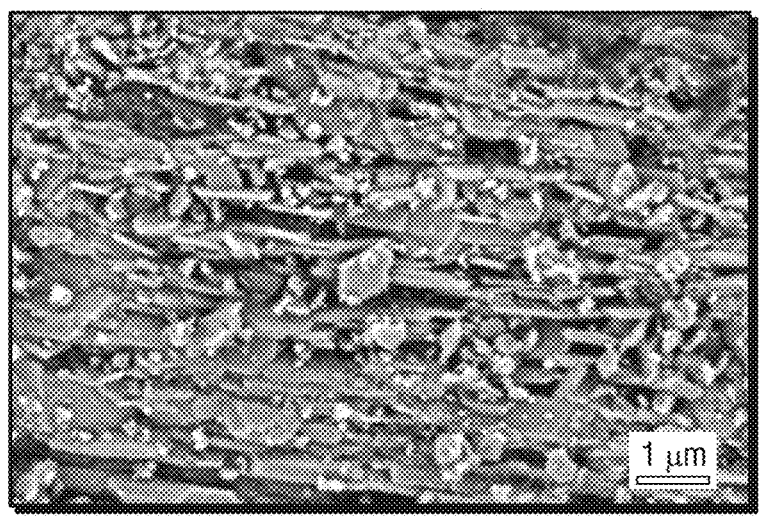
Figure 1C:
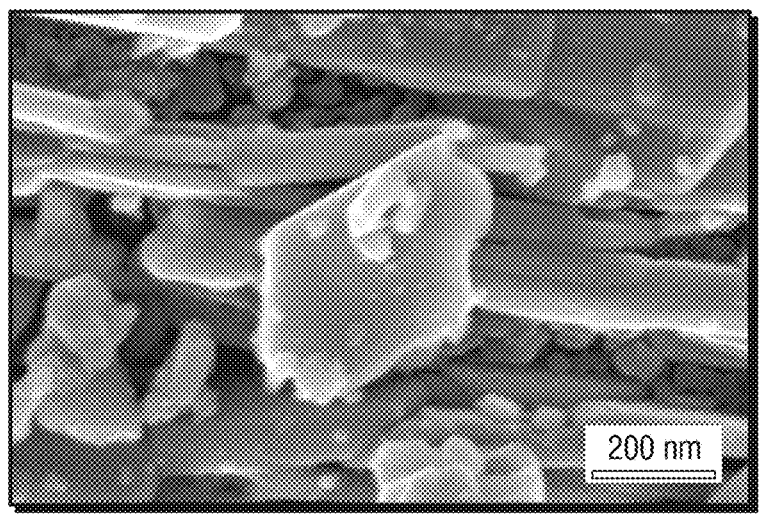
Figure 2:
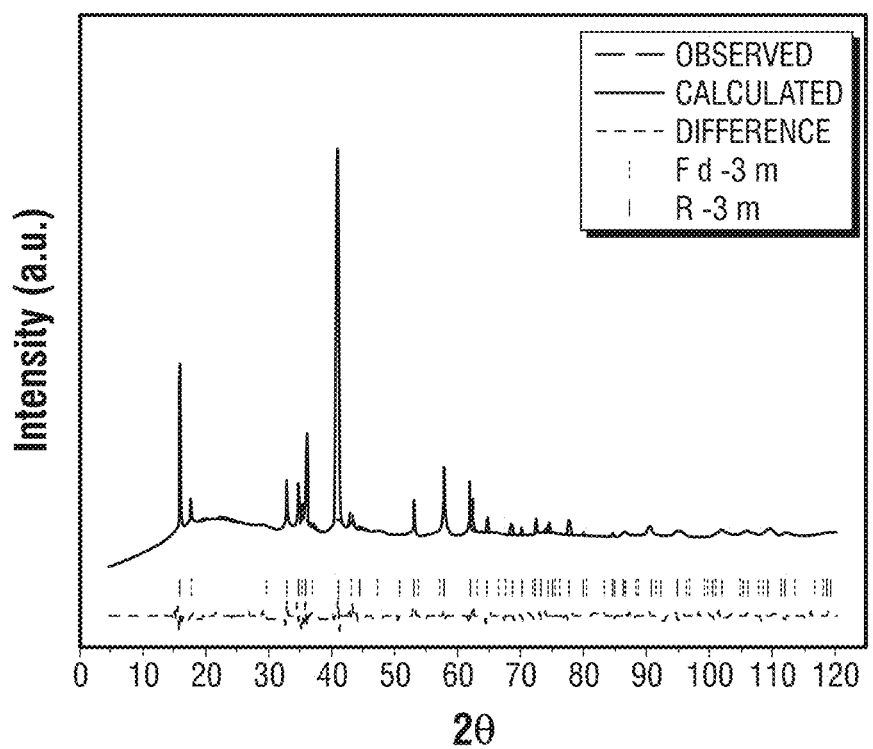
FIG. 2 is an XRD pattern and Reitveld refinement of the as-prepared LS-NFM powders in accordance with disclosed embodiments.

The morphology of LS-NFM electrode is investigated by SEM. FIGS. 1A-1C are SEM images of a LS-NFM electrode in accordance with disclosed embodiments and shows that the materials are generally plate-shaped particles. FIG. 2 is an XRD pattern and Reitveld refinement of the as-prepared LS-NFM powders in accordance with disclosed embodiments.

Structural parameters through Rietveld refinement are summarized in Table 1 below.

TABLE 1

| LS-NFM: R-3m phase (94 wt %) $a = 2.9550(2)$ Å, $c = 15.903(1)$ Å, $R_{wp} = 2.35\%$, $R_p = 1.37\%$ | | | | | |
|---|---|---|---|---|---|
| Atom | Wyckoff | X | Y | Z | Occupancy |
| Na | 3b | 0 | 0 | 0 | 1 |
| TM/Li | 3a | 0 | 0 | 0.5 | 0.857(4) |
| O | 6c | 0 | 0 | 0.2363(1) | 1 |
| LS-NFM: F d -3m phase (6 wt %) $a = 8.1806(8)$ Å, $R_{wp} = 2.35\%$, $R_p = 1.37\%$ | | | | | |
| Atom | Wyckoff | X | Y | Z | Occupancy |
| Li | 8a | 0.125 | 0.125 | 0.125 | 1 |
| Mn | 6d | 0.5 | 0.5 | 0.5 | 1 |
| O | 32e | 0.2428(1) | 0.2428(1) | 0.2428(1) | 1 |
| NFM: R-3m phase (Single) $a = 2.96894(4)$ Å, $c = 16.0119(4)$ Å, $R_{wp} = 2.22\%$, $R_b = 1.33\%$ | | | | | |
| Atom | Wyckoff | X | Y | Z | Occupancy |
| Na | 3b | 0 | 0 | 0 | 1 |
| TM/Li | 3a | 0 | 0 | 0.5 | 0.897(3) |
| O | 6c | 0 | 0 | 0.23581(9) | 1 |

The lattice parameters of LS-NFM were refined based on the rhombohedral α-NaFeO$_2$ structure (space group: R$\bar{3}$m) and cubic spinel structure (space group: Fd$\bar{3}$m) as the secondary phase. The calculated pattern is in good agreement with the experimental data where $R_{wp}=2.35\%$ and $R_p=1.37\%$. The Rietveld refinement result suggests that the LS-NFM material is composed of 94% of a dominant α-NaFeO$_2$ phase with the lattice parameters of a=b=2.9550(2) Å and c=15.903(1) Å and 6% of a secondary spinel phase with α=8.1806(8) Å. For the XRD pattern of NFM, the single α-NaFeO$_2$ phase was refined with the lattice parameters of a=b=2.96894(4) Å and c=16.0119(4) Å. A slight lattice shrinkage along the z-axis was observed in the LS-NFM sample compared to the NFM sample, which may due to partial oxidation of $Ni^{2+}$ (0.69 Å) to $Ni^{3+}$ (0.56 Å) because of the substitution of Li ions in the transition metal layer, and the result is consistent with previous report. Moreover, we conducted ex situ XRD on the as-prepared and first discharged (sodiated) laminated electrodes to investigate the structural evolution (shown in FIG. 3—the * represents the pronounced spinel planes) upon cycling. The cycled samples were covered by Kapton tape to prevent exposure to air. Both XRD patterns showed a dominant O3-type layered structure with the secondary spinel phase. The asterisk-marked peaks at 18.29°, 43.77° and 63.80° correspond to the (111), (400) and (511) planes of the spinel phase, respectively. In terms of the layered O3 phase, the (003) and (006) planes shifted to a higher angle after the first discharging process, suggesting a slight decrease in c. Because of the electrostatic attraction between $Na^+$ and $O^{2-}$ ions, the decrease in c can be ascribed to a higher concentration of $Na^+$ ions into the layered structure, filling in the Na vacancies in the as-prepared sample (see Table 1).

Figure 4A:
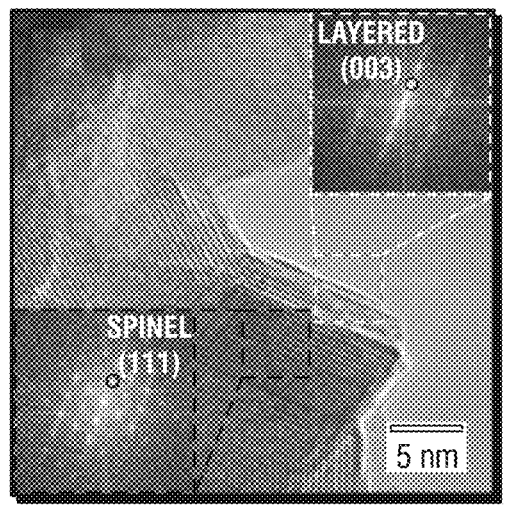
FIGS. 4A-4C show HRTEM images of A) as-prepared and B) first discharged, and C) fiftieth discharged LS-NFM sample in accordance with disclosed embodiments.
Figure 4B:
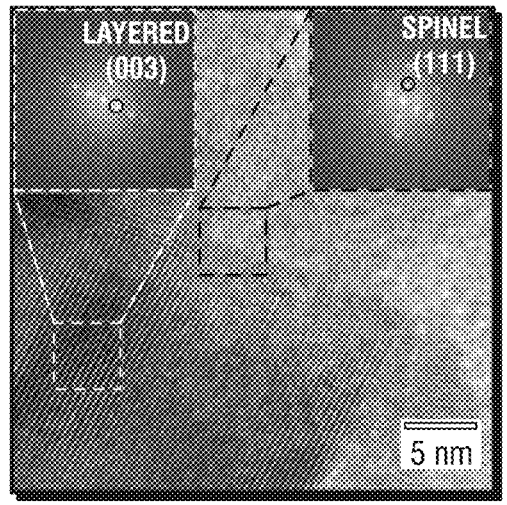
Figure 4C:
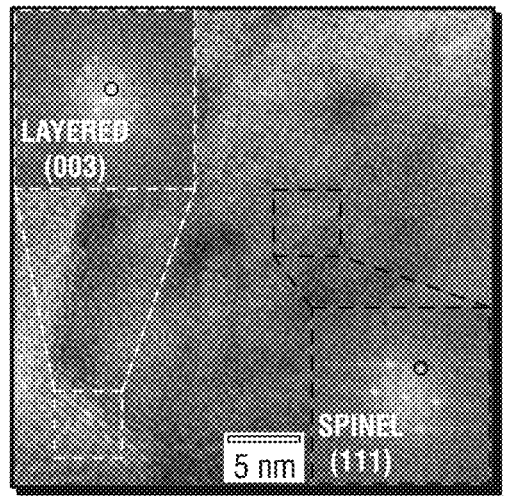
Figure 4D:
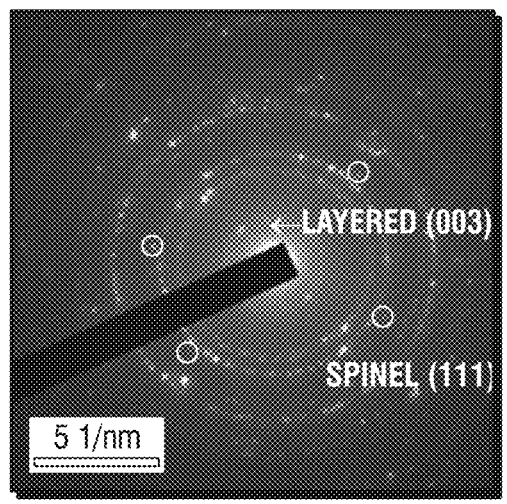
FIGS. 4D-4F show the SAED images of D) as-prepared and E) first discharged, and F) fiftieth discharged LS-NFM sample in accordance with disclosed embodiments.
Figure 4E:
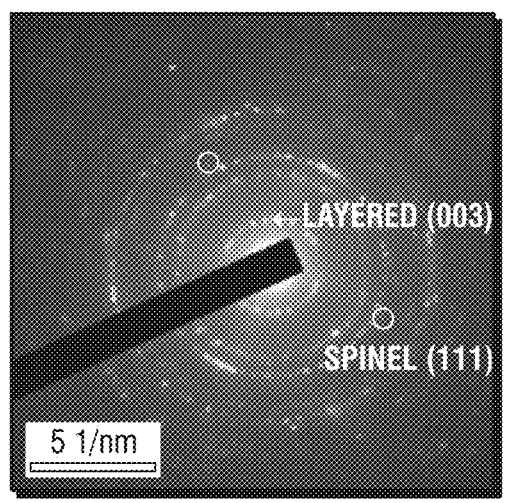
Figure 4F:
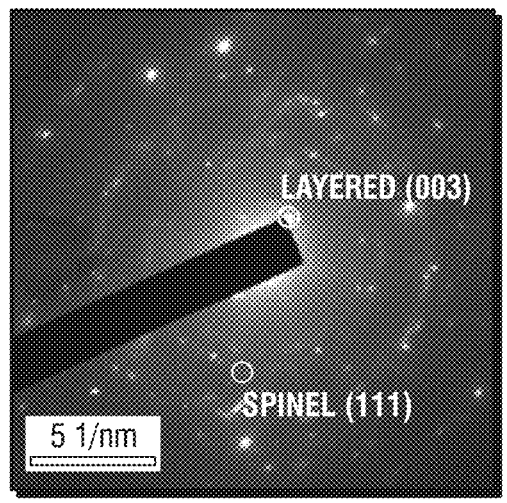

FIGS. 4a-4c show HRTEM images of A) as-prepared and B) first discharged, and C) fiftieth discharged LS-NFM sample. The black and white dashed squares indicate the spinel and layered components, respectively, where the corresponding fast Fourier Transform (FFT) images are shown as insets. The small black circles on FIGS. 4A-4C indicate the spinel (111) plane with the zone axis [110] and layered (003) plane with the zone axis [100], respectively. FIGS. 4D-4F show the SAED images of D) as-prepared and E) first discharged, and F) fiftieth discharged LS-NFM sample where the white circles and white arrows or circle indicate the planes from spinel and layered phase, respectively.

Figure 3:
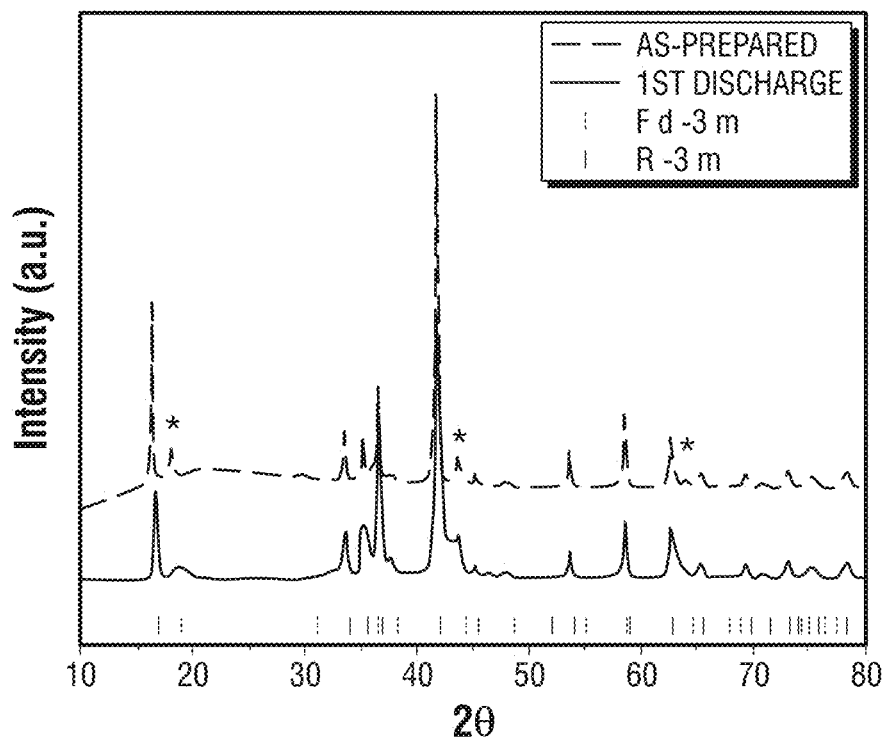
FIG. 3 is XRD patterns of as-prepared and first discharged laminated LS-NFM electrode in accordance with disclosed embodiments.

The HRTEM image of the as-prepared LS-NFM sample (FIG. 4A) exhibits the (003) plane of the layered phase and the (111) plane of the spinel phase where nanoscale domains of the layered and spinel components are structurally integrated. It is worth noting the great structural compatibility and connectivity of the two close-packed structures. After the first discharge, the close-packed layered and spinel phase in LS-NFM sample remained in the structure (FIG. 4b), which is consistent with the ex situ XRD results (FIG. 3). Note that after 50 cycles the layered and spinel structures still preserve (FIG. 4C), suggesting the great structural reversibility and stability. The SAED images of the as-prepared, first discharged, and fiftieth discharged LS-NFM sample are shown in FIGS. 4D-4F, respectively, where the white circles and white arrows indicate planes from the spinel and layered phase, respectively. The SAED pattern of the as-prepared LS-NFM displays a dominant polycrystalline layered O3-type structure and the minor spinel phase, consistent with the XRD result that the LS-NFM cathode contains a large amount of layered structure (94%) and a small fraction of the spinel phase (6%). The existence of the spinel phase in the first discharged sample (FIG. 4E) as well as the fiftieth discharged sample (FIG. 4F) suggests good structural stability of the LS-NFM cathode.

Figure 6A:
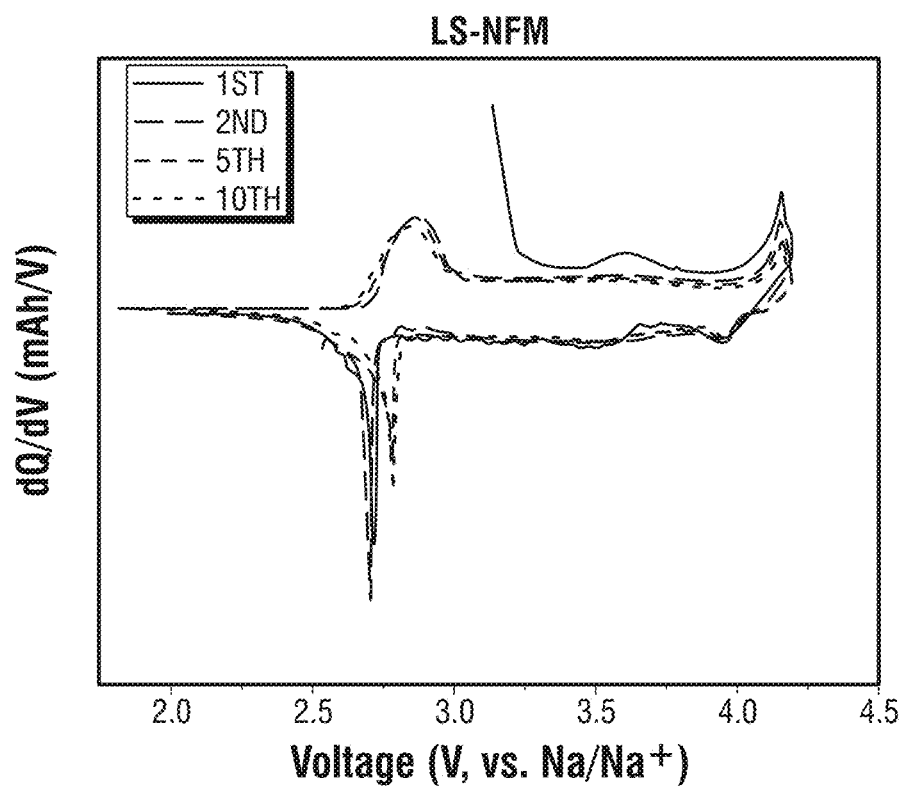
FIGS. 6A-6B show dQ/dV plots of A) LS-NFM and B) NFM sample in accordance with disclosed embodiments.
Figure 6B:
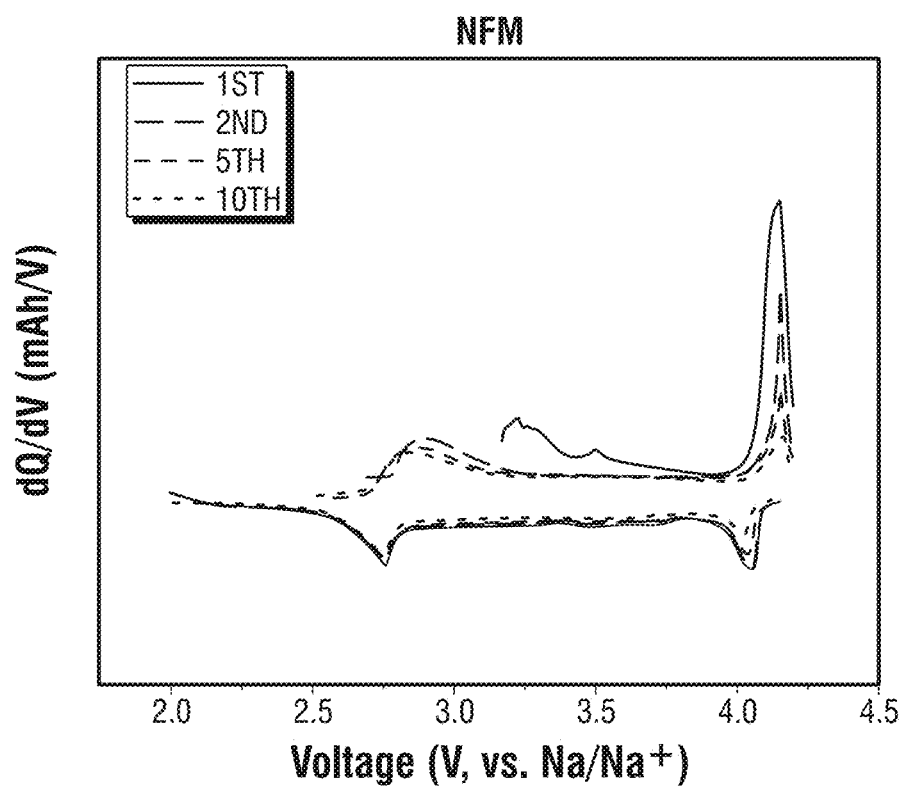

The voltage profiles of LS-NFM and NFM electrodes cycled with a potential window of 2-4.2 V at 12 mA g$^{-1}$ are presented in FIGS. 5A and 5B, respectively. The corresponding dQ/dV plots are shown in FIGS. 6A-6B. Both cathodes have a similar plateau region during charging (~2.75-2.9 V) and discharging (2.8-2.5 V) processes, which correspond to the reversible phase transitions between O3 and P3 phases. In addition, both cathodes exhibit a plateau at ~4.16 V (FIGS. 5A and 5B) as can be also indicated by the oxidation peak in the dQ/dV plots (FIGS. 6A-6B) during the charging process, which could be associated with the phase transition from P3 to O3' (also known as O3 phase at high voltage). Moreover, side reactions with electrolyte, formation of solid electrolyte interphase (SEI), and/or polarization may also contribute to the plateau at high voltage. For discharging process of the NFM cathode, a distinct plateau at 3.9-4.1 V gradually became sloping after 10 cycles, and the corresponding peak intensity in the dQ/dV plot significantly decreased (FIGS. 6A-6B), which can be attributed to the irreversible transition from O3' to P3 phase and/or detrimental coinsertion of solvent in the electrolyte at high voltages. On the other hand, the plateau at ~4.16 V of the LS-NFM cathode is maintained for subsequent cycles (FIGS. 6A-6B) during discharging process, suggesting a reversible phase transition. The sloping profiles between the plateaus at higher and lower voltages, for both cathodes could be related to a solid-solution reaction with P3 structure. The first charge capacity of LS-NFM and NFM were 180 mAh g$^{-1}$ and 205 mAh g$^{-1}$, respectively, and the first-cycle Coulombic efficiency of LS-NFM cathode (73%) had been significantly enhanced compared to the NFM cathode (52%), which is possibly due to the structural stabilization by the spinel phase in the mixed phased LS-NFM cathode. Although the Coulombic efficiency has been improved in the LS-NFM cathode, it is not high possibly due to the irreversible side reaction at the surface or the formation of SEI at high upper cutoff potential (4.2 V).

We have studied the cycling performance of both LS-NFM and NFM electrodes (FIG. 5C) at a current rate of 100 mA g$^{-1}$. The first discharge capacity of NFM (104 mAh g$^{-1}$) is much smaller than that of LS-NFM (112 mAh g$^{-1}$). Moreover, LS-NFM exhibits a higher discharge capacity and capacity retention (96 mAh g$^-$, 86%) than the NFM control (75 mAh g$^-$, 70%) after 100 cycles, indicating a significantly improved cycling performance of LS-NFM cathode. The first-cycle Coulombic efficiency of Li-NFM is 88% and approaches 99% after five cycles, much faster than the NFM cathode, which reaches 99% Coulombic efficiency after 28 cycles. The improved Coulombic efficiency is possibly due to the unique design of LS-NFM cathode with the intergrown spinel phase stabilizing the layered structure.

One of the advantages of the layered-spinel cathodes used for lithium-ion batteries is the enhanced rate capability due to the shortened diffusion path that is created by the integration of 3D channels (spinel phase), and 2D channels (layered phase). We also investigated the rate capability of our layered-spinel cathode for sodium ion batteries (FIG. 5D). Both LS-NFM and NFM cathodes were cycled at the rate of 12 mA g$^{-1}$, 36 mA g$^{-1}$, 120 mA g$^{-1}$, 36 mA g$^{-1}$, and back to 12 mA g$^{-1}$. The LS-NFM cathode delivered 129 mAh g$^{-1}$ at 12 mA g$^{-1}$ and 101 mAh g$^{-1}$ at 120 mA g$^{-1}$. When cycled back to the low current rate of 12 mA g$^{-1}$, it delivered a capacity of 118 mAh g$^{-1}$, with a 92% capacity retention. In contrast, the NFM cathode delivered 106 mAh g$^{-1}$. and 66 mAh g$^{-1}$ in capacity at the initial rates of 12 mA g$^{-1}$ and 120 mA g$^{-1}$. It exhibited a 84 mAh g$^{-1}$ capacity when cycled back to the low rate of 12 mA g$^{-1}$, with a 80% capacity retention. The LS-NFM electrode exhibited a better rate capability and capacity retention compared to the NFM electrode.

Figure 7A:
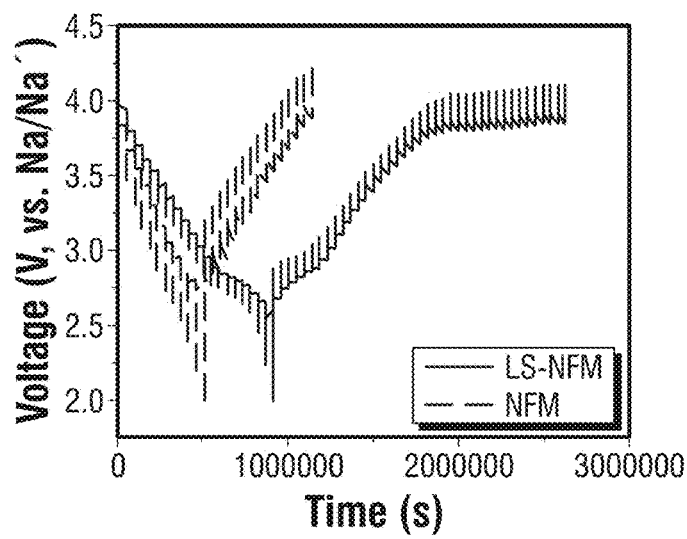
FIGS. 7A-7C show respectively the (A) GITT profile and Na+ diffusivity as a function of voltage of LS-NFM and NFM cathodes in (B) charge and (C) discharge process in accordance with disclosed embodiments.
Figure 7B:
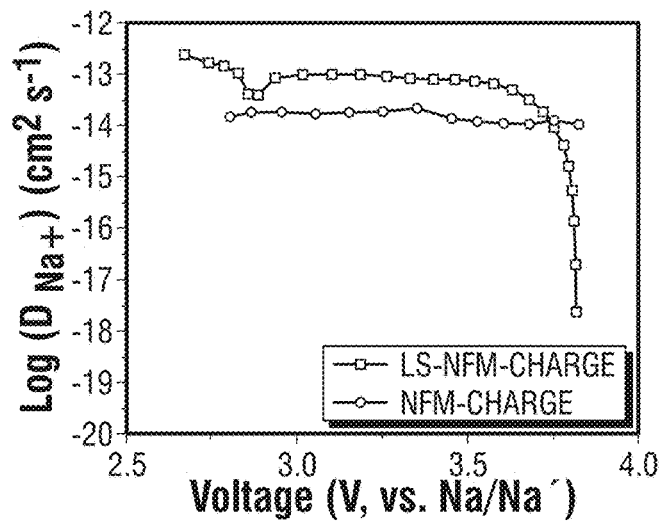
Figure 7C:
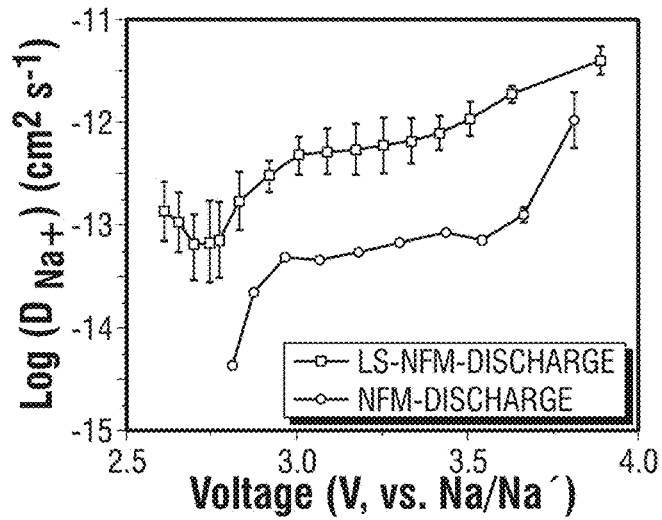
Figure 8C:
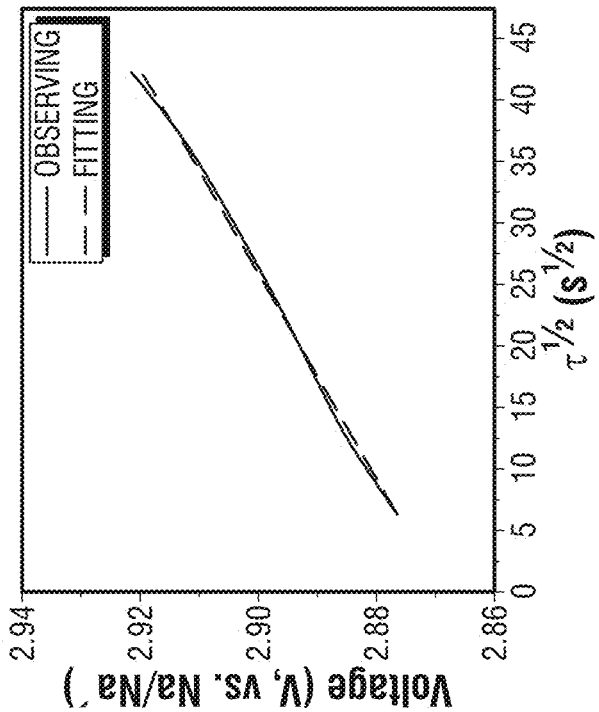
FIGS. 8A and 8C show the linear behavior of the E vs $\tau^{1/2}$ relationship in (A) discharge and (C) charge process in accordance with disclosed embodiments.
Figure 8A:
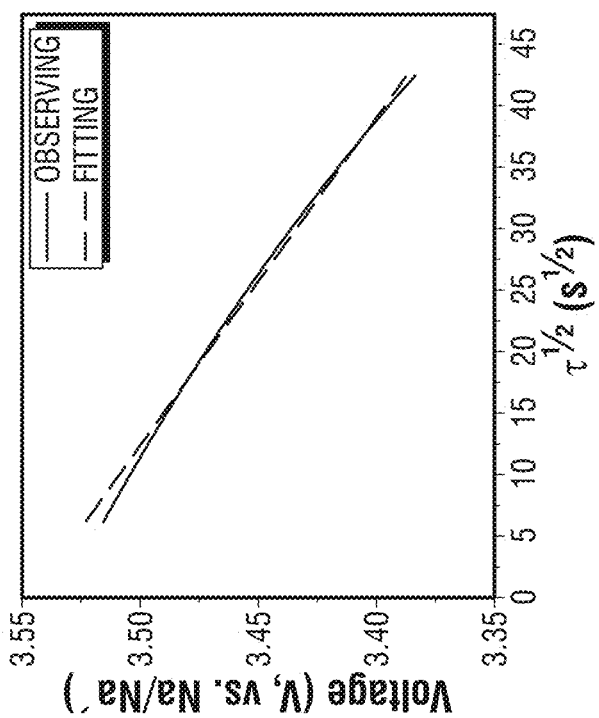
Figure 8B:
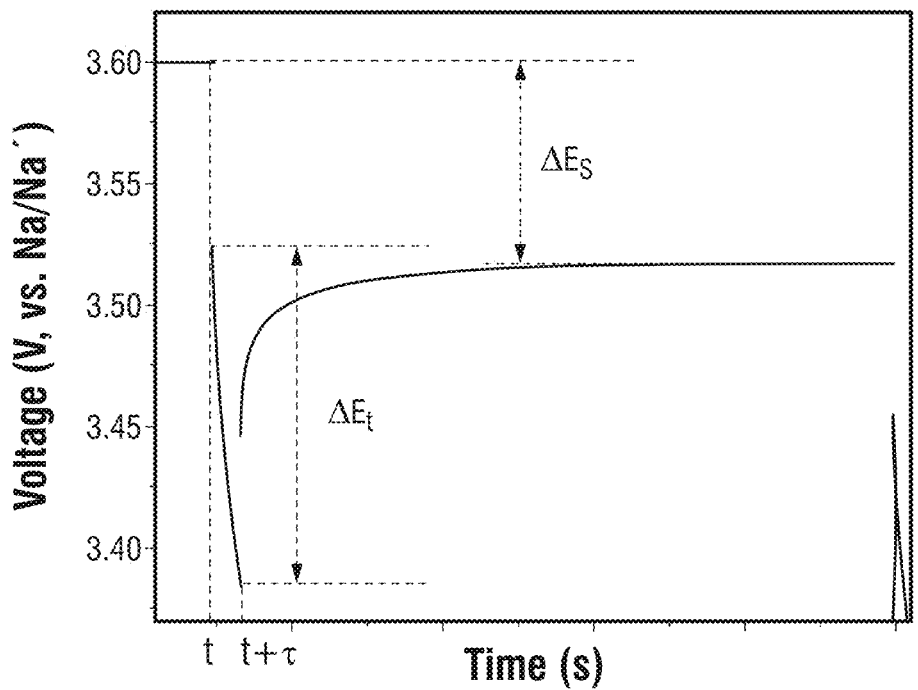
FIGS. 8B and 8D show a schematic of GITT technique in (B) discharge and (D) charge process in accordance with disclosed embodiments.
Figure 8D:
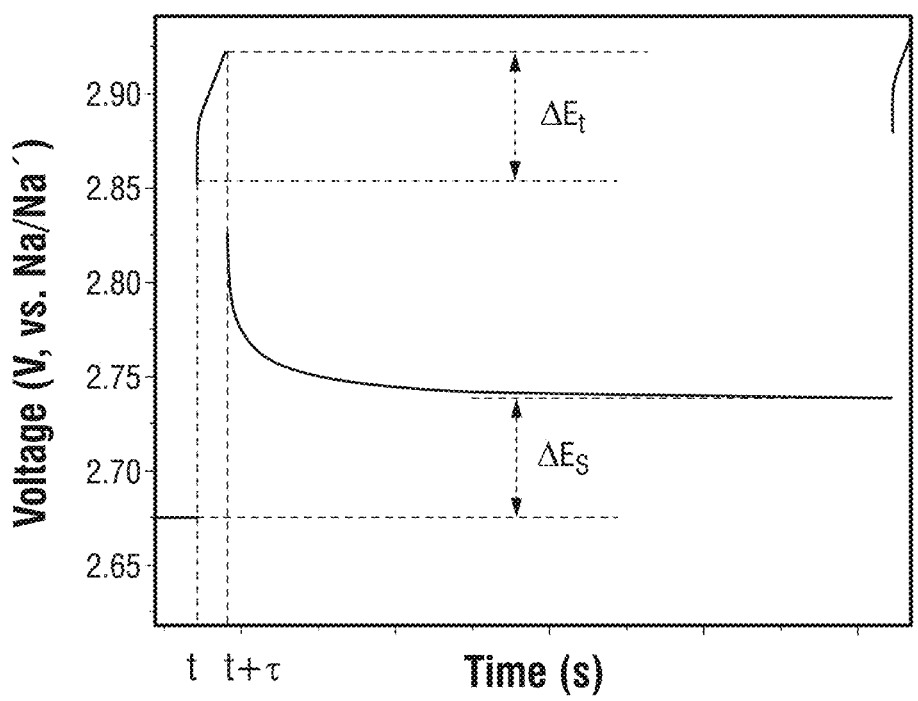

The improved rate capability in LS-NFM electrode suggests faster charge transport kinetics within the LS-NFM cathode, thus we conducted GITT to investigate the Na$^+$ diffusion coefficient of cycled LS-NFM and NFM electrodes (FIG. 7A). The plot of Na$^+$ diffusivity as a function of voltage during the charge and discharge process is shown in FIGS. 7B and 7C, respectively. (Details of GITT analysis can be found in FIGS. 8A-8D). At the beginning of the charging process, the diffusion coefficient of LS-NFM (2.4× 10$^{-13}$ cm$^2$ s$^{-1}$ at 2.67 V), is about 1 order of magnitude higher than that of NFM (1.44×10$^{-14}$ cm$^2$ s$^{-1}$), and the diffusivity of LS-NFM surpasses that of the NFM cathode until the electrodes are charged to 3.75 V. Moreover, the diffusivity of the LS-NFM electrode during discharge process is also ~1 order of magnitude higher than that of the NFM electrode throughout the whole potential window. The LS-NFM electrode exhibits a faster Na$^+$ diffusivity in both charge and discharge processes compared to the NFM electrode. This result is in good agreement with the rate capability study discussed above. The improved Na$^+$ diffusivity in LS-NFM is possibly due to the 3D diffusion channels from the spinel structure that provide direct connectivity between layered and spinel components, which greatly shorten the diffusion distance. This hypothesis has been investigated in layered-spinel cathode materials for lithium ion batteries. The diffusion coefficients of LS-NFM drop when the voltage was near 2.82 V, and recover at 2.93 V, which can be explained by the phase transformation between O3 and P3 phases, consistent with the plateau region in voltage profiles (FIG. 5A). This implies the O3-P3 phase transformation is a diffusion-controlled process associated with the complex Na ion/vacancy ordering and host rearrangement. At the region of 2.93-3.63 V, the diffusion coefficients in both LS-NFM and NFM electrodes remain stable, indicating a relatively low kinetic barrier of Na ion extraction from the host materials. When the electrodes are charged above 3.63 V, the significant decrease of the diffusion coefficient of LS-NFM can be ascribed to the sluggish phase transformation from P3 to O3' phase, which was observed in in situ XRD studies elsewhere. On the other hand, the decrease of diffusion coefficient at high voltage is not observed in the NFM cathode, possibly due to the irreversible P3-O3' phase transition during the initial cycle. Indeed, the long plateau at ~4.16 V during the first charge (FIG. 5B) becomes sloping after first cycle and the corresponding peak intensity in dQ/dV (FIGS. 6A-6B) significantly decreases, both of which suggest the irreversible P3-O3' phase transition in NFM electrode.

Figure 9A:
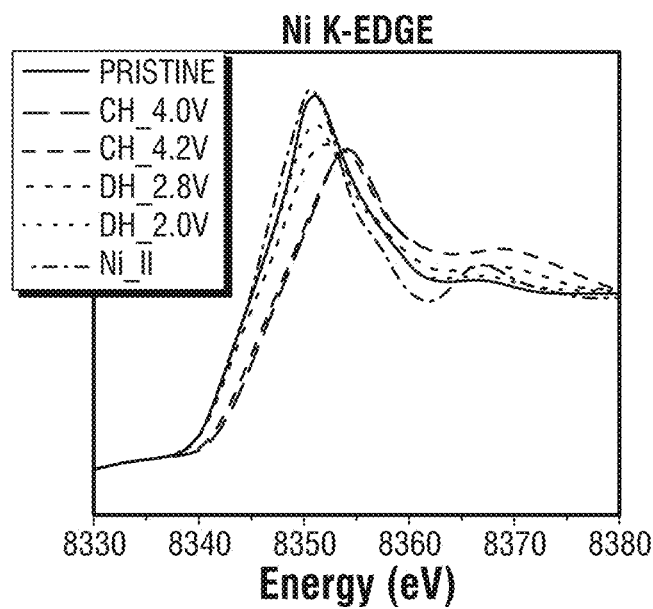
FIGS. 9A-9C show ex situ (A) Ni, (B) Mn, (C) Fe K-edge XANES spectra of LS-NFM electrode at different SOCs during the first charging and discharging process in accordance with disclosed embodiments. The inset in (B) shows the pre-edge features of Mn K-edge spectra of samples at different SOCs where P1 and P2 correspond to transitions from 1 s to 3 $de_g$ and 3 $dt_{2g}$ with a weak crystal field, respectively. The inset in (C) is the first-derivative curves of the original data.
Figure 9B:
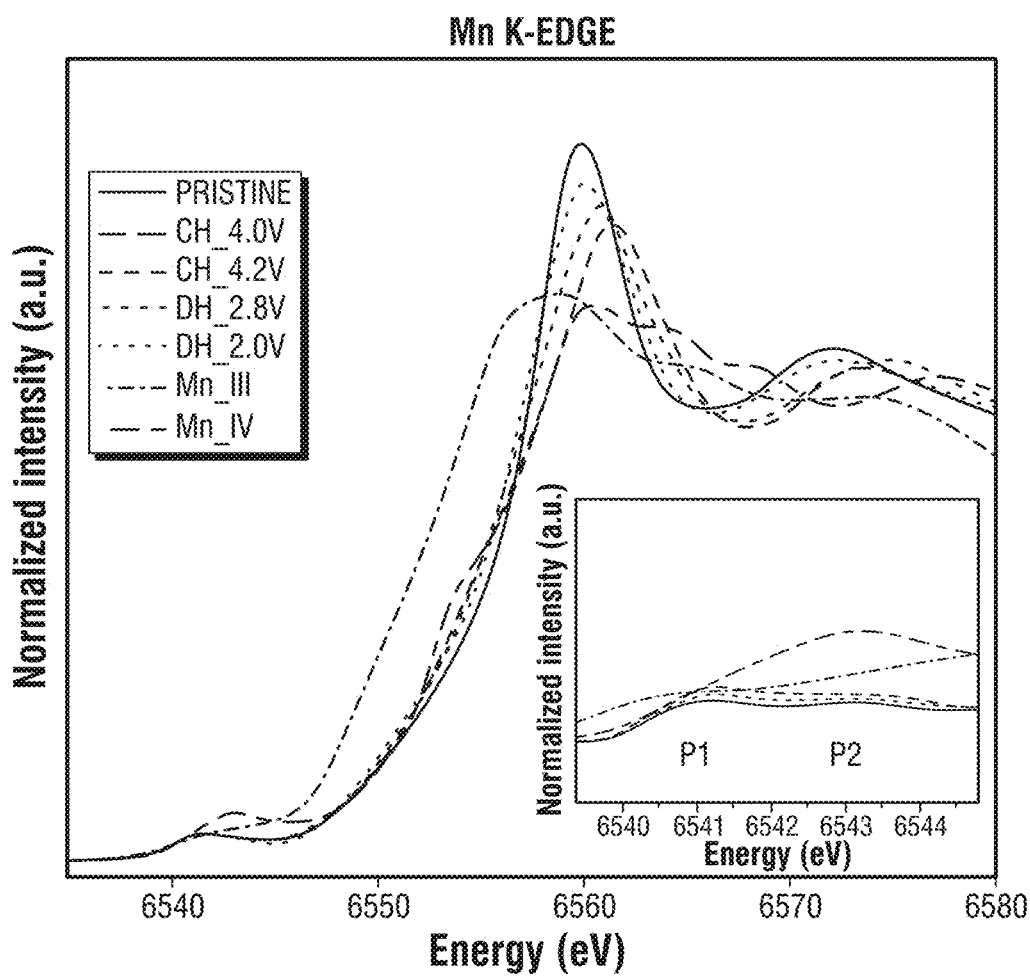
Figure 9C:
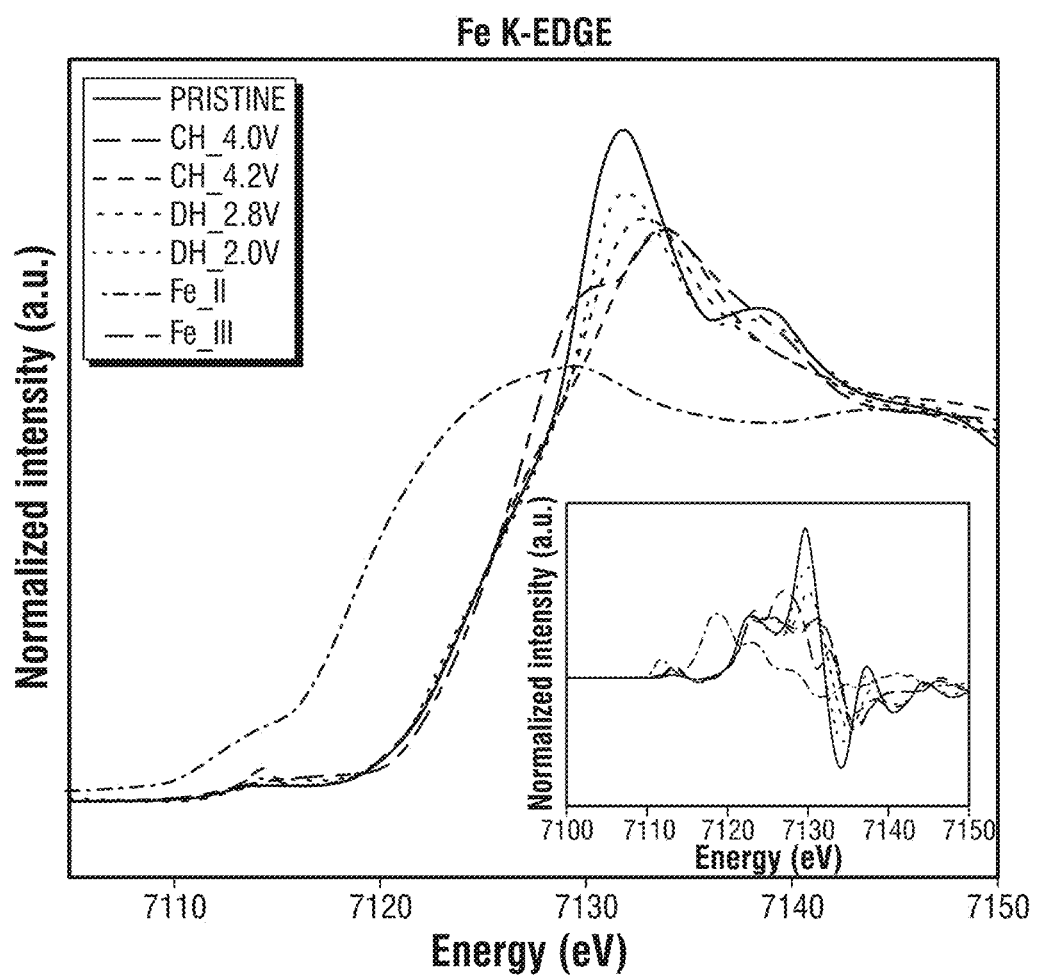

The ex situ XAS was conducted to explore the chemical environment of transition metals at various states of charge (SOC) including: pristine, charged to 4.0 V, charged to 4.2 V, discharged to 2.4 V and discharged to 2.0 V (FIGS. 9A-9C). X-ray adsorption near edge spectroscopy (XANES) spectra at Ni, Mn and Fe K-edges are shown in FIGS. 9A, 9B and 9C, respectively. The onset of the transition metal k-edge is resulted from the symmetry-allowed transitions from the 1s core electron to excited vacant bound states. The pre-edge absorption is formally electric dipole-forbidden transition of a is electron to an unoccupied 3d orbital. The first strong absorption in the low-energy region corresponds to a shakedown process originally, from the ligand-to-metal charge transfer (LMCT). The main absorption edge is due to the electric dipole allowed transition from 1s to a 4p state. The Ni k-edge spectra of the pristine sample and the NiO standard closely resembled each other, indicating the existence of Ni$^{2+}$. A significant shift of the edge to higher energy is observed during the charge process, suggesting the oxidation of Ni$^{2+}$ ions during the extraction of Na ions. The Ni K-edge spectra gradually shift back to the pristine low-energy region during discharge process, suggesting the reversible reduction of high oxidation state Ni ions back to Ni1$^{2+}$. The edge position of the Mn K-edge spectrum of the pristine LS-NFM sample is similar to that of the MnO$_2$ standard, indicating the pristine sample contains tetravalent Mn ions. As the Na ions are (de)intercalated, the shape of Mn K-edge spectra changes due to the changes in the Mn local environment but there is not a rigid shift to higher energy. A small shift of edge position during charge and discharge process is observed, which is consistent with a previous study of NFM (NaNi$_{0.25}$Fe$_{0.5}$Mn$_{0.25}$O$_2$) electrode. Because it is very difficult to oxidize Mn$^{4+}$ to a higher valence electrochemically, the small shift can be presumably attributed to the change of the local structure of manganese coordination. The FIG. 9B inset shows the pre-edge features of Mn K-edge spectra of samples at different SOC where P1 and P2 correspond to transitions from 1 s to 3 de$_g$ and 3 dt$_{2g}$ with a weak crystal field, respectively. A very subtle increase in intensity confirms the negligible valence change of Mn ions. The oxidation state of Fe ions can be determined by the inflection point of the Fe K-edge spectra, which is indicated by the peak maxima in the first-derivative curve (FIG. 9C inset). The inflection points of the pristine, 4.3 V-charged and 2.0 V-discharged samples located at 7129.8 eV, 7131.4 eV and 7130.0 eV, respectively. A small shift of the inflection points to higher energy when charged above 4.0 V indicates that the Fe ions are slightly oxidized. When discharged back to 2.0 V, the peak maxima shifted back to the position of pristine sample, suggesting a reversible Fe ion redox reaction, consistent with a previous study. In summary, in this layered-spinel cathode material, nickel is the dominant electrochemical redox species and largely contributes to the specific capacity along with minor contribution from Fe redox.

Figure 9E:
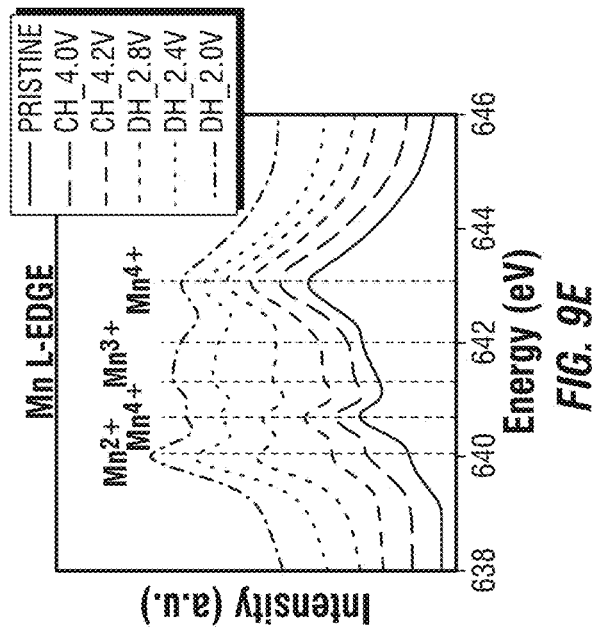
FIGS. 9D-9F show ex situ (D) Ni, (E) Mn, (F) Fe L-edge sXAS spectra of LS-NFM electrode at different SOCs during the first charging and discharging process in accordance with disclosed embodiments. The data were recorded under TEY mode.
Figure 9F:
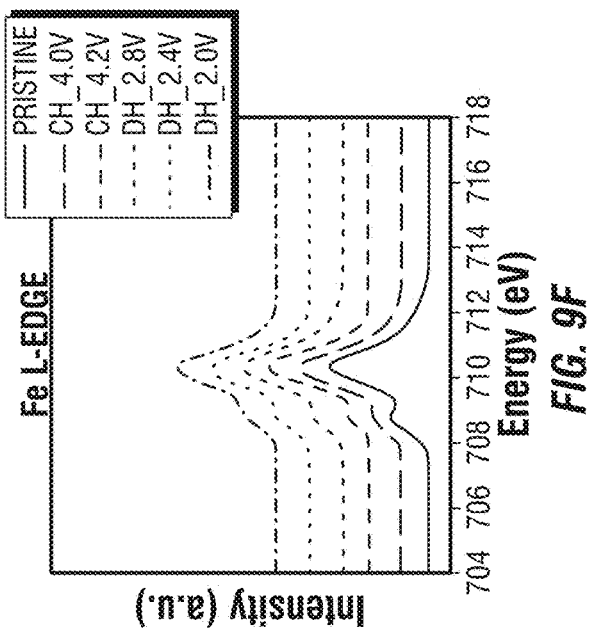
Figure 9D:
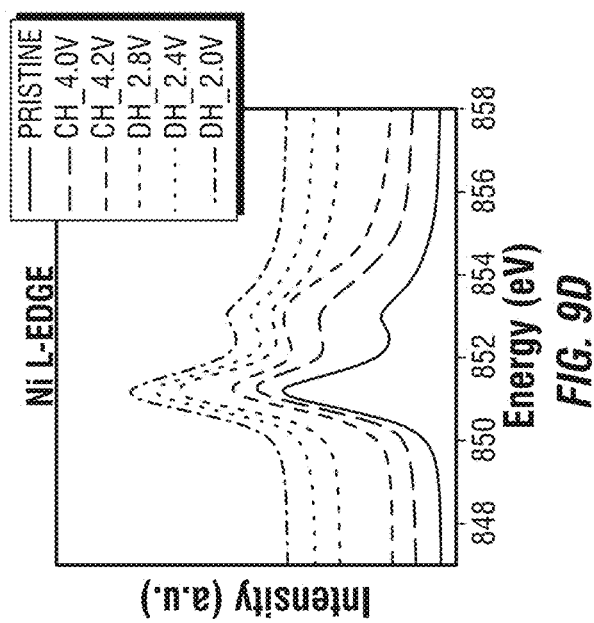

In addition to the investigation of the chemical state in the bulk material, soft XAS (sXAS) is used to probe chemical environments at the surface with depth sensitivities. The incident X-rays are absorbed by the sample through excitation of core-level electrons to unoccupied states above the vacuum or Fermi level. Total electron yield (TEY) accounts for all the electrons escaping from the surface of the material and is measured by the net current that flows into the sample to neutralize the positively charged sample by escaped electrons. The probing depth of TEY mode is approximately 2-5 nm due to the mean free path of electrons in the sample, largely representing the surface environment of examined materials. FIG. 9D shows the TEY mode of Ni L3 edge of the LS-NFM samples. The splitting of the edge can be attributed to the Ni 2p-Ni 3d electrostatic interaction and crystal field effect. The integrated peak ratio of split edge at high energy ($L3_{high}$) over low energy ($L3_{low}$) has a positive relation with the oxidation state of nickel. The split edge ratio of pristine, 4.0 V-charged and 4.3 V-charged sample are 0.56, 1.73 and 2.22, respectively, suggesting the cathode is gradually oxidized during the charging process, while during the discharging process, the ratios of 2.8 V-discharged, 2.4 V-discharged, and 2.0 V-discharged states are 0.90, 0.58, and 0.56, respectively, suggesting the reduction of Ni ions. The ratio of pristine and fully-discharged samples are both 0.56, suggesting great reversibility of Ni redox couple. The TEY mode spectra of Mn L3 edge of the ex situ samples are also shown in FIG. 9E. The peak at 640 eV corresponds to $Mn^{2+}$ ions, the peak at 641.36 and 641.97 eV to $Mn^{3+}$ ions, and the peak at 640.71 and 643.05 eV to $Mn^{4+}$ ions, as illustrated by the dashed line. The pristine sample shows dominant $Mn^{4+}$ ions in the structure. Little change is observed during the charging process to 4.2 V. However, a significant amount of $Mn^{4+}$ ions are reduced to $Mn^{3+}$ and $Mn^{2+}$ ions when discharged at 2.8 V. The reduction of $Mn^{4+}$ ions continued during the discharging process to 2.0 V. Note that in the traditional O3-type layered NFM cathode ($NaNi_{0.25}Fe_{0.5}Mn_{0.25}O_2$), the $Mn^{4+}$ ion in the bulk is not electrochemically active during both charging and discharging processes. However, $Mn^{4+}$ ions possibly react with trace amount of moisture in the electrode-electrolyte interface, leading to the slight reduction of $Mn^{4+}$ ions to $Mn^{3+}$ ions, which has been observed in a previous study of a pure R-3m phase Li-doped NFM cathode ($Na[Li_{0.05}(Ni_{0.25}Fe_{0.25}Mn_{0.5})_{0.95}]O_2$), where a small shift during the charging process from $Mn^{4+}$ to $Mn^{3+}$ ions was observed by XPS. In the layered-spinel cathode, a small amount of $Mn^{2+}$ ions are generated during the charging process, presumably indicating that $Mn^{4+}$ ions are first reduced to $Mn^{3+}$ ions, followed by the disproportionate reaction $2Mn^{3+}=Mn^{2+}+Mn^{4+}$ of the specific and particular spinel composition at the electrode surface. This reaction might form a surface layer, blocking the insertion of the solvent molecules and/or electrolyte anions into the layered structure, and therefore enhance the structural stability. Furthermore, a reduction of $Mn^{4+}$ ions to $Mn^{3+}$ and $Mn^{2+}$ ions is observed during the discharging process. As for Fe L3-edge, the ratio of split edge at high energy over low energy has a positive relation with the oxidation state of iron. The ratio of integrated intensity at high energy over that at low energy increases from pristine to charged-4.0 V sample, suggesting Fe ions are oxidized when charged above 4.0 V, consistent with the XANES result (FIG. 9C) and the practical first charge capacity (FIG. 5A).

Figure 10A:
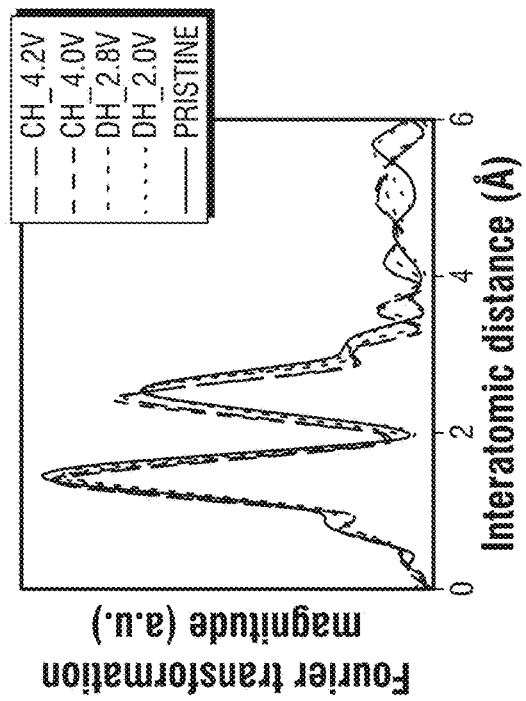
FIGS. 10A-10C show ex situ Fourier transformed (A) Ni, (B) Mn, (C) Fe K-edge EXAFS spectra of LS-NFM electrode at different SOCs during the first charging and discharging process in accordance with disclosed embodiments.
Figure 10C:
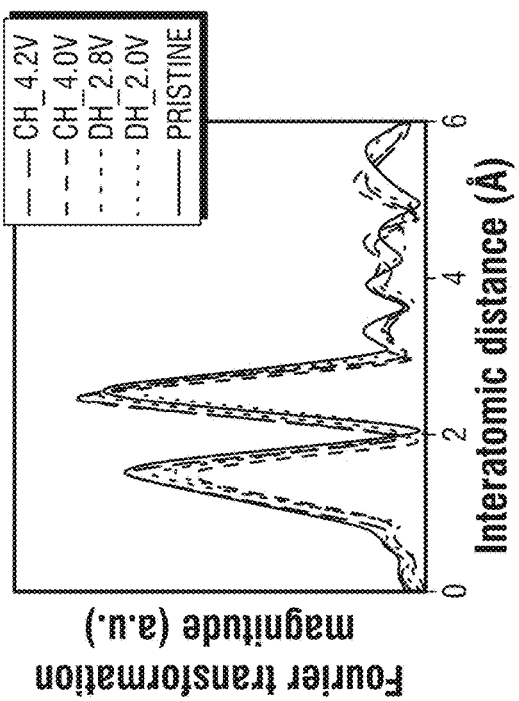
Figure 10B:
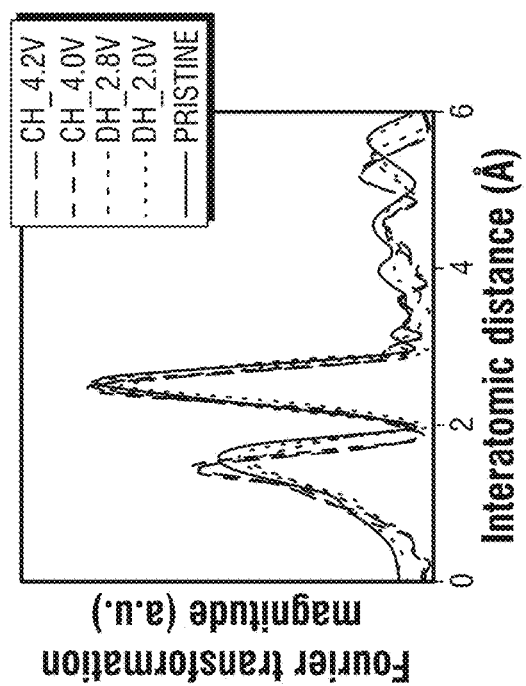

We have examined the local structural evolution of LS-NFM cathode by hard x-ray EXAFS spectra. FIGS. 10A, 10B and 10C show the Fourier transform magnitudes of Ni, Mn and Fe K-edge spectra, respectively. The first intense peak is attributed to the TM-O coordination shell, and the second is TM-TM shell. The quantitative fitting of EXAFS spectra shown in FIGS. 10D, 10E, and 10F (fitting details are provided in Table 2, below) provides the distances of TM-O and TM-TM bonds. For the pristine sample, the distances of Ni—O, Mn—O and Fe—O are 2.07 Å, 1.91 Å and 2.02 Å, respectively, consistent with the Shannon's ionic radii where the distance of $Ni^{II}$—O, $Mn^{IV}$—O and $Fe^{III}$—O are 2.09 Å, 1.93 Å and 2.01 Å, respectively, suggesting the good fitting of EXAFS spectra. The distance of Ni-TM, Mn-TM and Fe-TM are comparable to each other, indicating the uniform distribution of Ni, Mn and Fe ions. When charged to 4.0 V, the Ni—O distance significantly decreases to 1.92 Å, and the Fe—O distance slightly decreased to 1.97 Å, suggesting the oxidation of Ni and Fe ions. However, the negligible decrease in Mn—O distance indicates the change of local environment of Mn ion but not the change of oxidation state. Therefore, we conclude that Ni redox couple contributed to most of capacity in the LS-NFM cathode. When discharged at 2.0 V, the distance of Ni—O, Mn—O and Fe—O return to 2.06 Å, 1.90 Å and 2.01 Å, respectively, suggesting the good reversibility of all redox pairs. Moreover, all of the TM-TM distance decrease when the sample is charged above 4.0 V, which is probably due to the decrease of the lattice parameter corresponding to the in-plane interatomic distance. When discharged to 2.0 V, all of the TM-TM distance reversibly increased. In summary, the EXAFS results exhibit the reversible evolution of both redox couple and crystal structure of LS-NFM cathode, which is determined by the evolution of TM-O and TM-TM bonding length that decreases during charging process and reversibly increases during discharging process. This reversible evolution presumably is resulted from the intergrowth of spinel and layered phase that stabilized the crystal structure above 4.0V.

TABLE 2

| | CN_Fe—O | CN_Fe—Me | R-factor | ΔE (eV) | $\sigma^2$_Fe—O ($\times 10^{-3}$ Å$^2$) | $\sigma^2$_Fe—Me ($\times 10^{-3}$ Å$^2$) | $R_{Fe—O}$ (Å) | $R_{Fe—Me}$ (Å) | k range (Å) | r range (Å) |
|---|---|---|---|---|---|---|---|---|---|---|
| Fe-AsPrep | 6 | 6 | 0.016285 | −7.01821526 | 6.66804 | 5.38233 | 2.01284 | 2.96731 | 3-12 | 1-3 |
| Fe-char-4 V | 6 | 6 | 0.156745 | −7.73651372 | 12.13892 | 6.13947 | 1.97241 | 2.90489 | 3-12 | 1-3 |
| Fe-char-4.2 V | 6 | 6 | 0.021761 | −3.03152492 | 9.37328 | 6.71868 | 1.96781 | 2.9027 | 3-12 | 1-3 |

TABLE 2-continued

| | | | | ΔE (eV) | $\sigma^2$_Fe—O ($\times 10^{-3}$ Å$^2$) | $\sigma^2$_Fe—Me ($\times 10^{-3}$ Å$^2$) | $R_{Fe-O}$ (Å) | $R_{Fe-Me}$ (Å) | k range (Å) | r range (Å) |
|---|---|---|---|---|---|---|---|---|---|---|
| Fe-Dis-2.8 V | 6 | 6 | 0.012082 | −7.41624582 | 8.70901 | 6.80846 | 1.99568 | 2.92926 | 3-12 | 1-3 |
| Fe-dis-2.0 V | 6 | 6 | 0.01471 | −7.23334411 | 8.59873 | 6.64996 | 2.01025 | 2.96228 | 3-12 | 1-3 |

| | CN_Mn—O | CN_Mn—Me | R-factor | ΔE (eV) | $\sigma^2$_Mn—O ($\times 10^{-3}$ Å$^2$) | $\sigma^2$_Mn—Me ($\times 10^{-3}$ Å$^2$) | $R_{Mn-O}$ (Å) | $R_{Mn-Me}$ (Å) | k range (Å) | r range (Å) |
|---|---|---|---|---|---|---|---|---|---|---|
| Mn-AsPrep | 6 | 6 | 0.023851 | −5.98985154 | 9.78389 | 4.0472 | 1.91375 | 2.94187 | 3-12 | 1-3 |
| Mn-char-4 V | 6 | 6 | 0.021841 | −7.48094919 | 5.59903 | 4.17578 | 1.89319 | 2.87574 | 3-12 | 1-3 |
| Mn-char-4.2 V | 6 | 6 | 0.024603 | −8.99130822 | 5.55543 | 4.89835 | 1.38377 | 2.87071 | 3-12 | 1-3 |
| Mn-Dis-2.8 V | 6 | 6 | 0.016574 | −7.1166934 | 5.85161 | 5.18614 | 1.89643 | 2.89567 | 3-12 | 1-3 |
| Mn-dis-2.0 V | 6 | 6 | 0.038514 | −7.10109362 | 6.887 | 4.17724 | 1.90484 | 2.93251 | 3-12 | 1-3 |

| | CN_Ni—O | CN_Ni—Me | R-factor | ΔE (eV) | $\sigma^2$_Ni—O ($\times 10^{-3}$ Å$^2$) | $\sigma^2$_Ni—Me ($\times 10^{-3}$ Å$^2$) | $R_{Ni-O}$ (Å) | $R_{Ni-Me}$ (Å) | k range (Å) | r range (Å) |
|---|---|---|---|---|---|---|---|---|---|---|
| Ni-AsPrep | 6 | 6 | 0.005136 | −6.6364052 | 6.76932 | 5.19269 | 2.06801 | 2.96454 | 3-12 | 1-3 |
| Ni-char-4 V | 6 | 6 | 0.014329 | −11.32064823 | 7.90576 | 5.35778 | 1.92072 | 2.88331 | 3-12 | 1-3 |
| Ni-char-4.2 V | 6 | 6 | 0.01234 | −10.60707459 | 8.68799 | 5.94378 | 1.92051 | 2.88306 | 3-12 | 1-3 |
| Ni-Dis-2.8 V | 6 | 6 | 0.006976 | −4.37472851 | 11.63148 | 5.88576 | 2.91353 | 2.91598 | 3-12 | 1-3 |
| Ni-dis-2.0 V | 6 | 6 | 0.055932 | −6.90731808 | 8.13756 | 5.9196 | 2.06283 | 2.96158 | 3-12 | 1-3 |

We successfully prepared a layered-spinel cathode material for sodium ion batteries by Li substitution. In the traditional Li-substituted cathode, Li ions are located at the transition metal sites and form a single phase. However, we prepared a mixed-phased layered-spinel cathode by increasing the Li stoichiometry. The Rietveld refinement on the XRD pattern suggests that the as-prepared material is composed of a 94% dominant O3-type layered phase and 6% secondary spinel phase. The HRTEM images show the remarkable structural compatibility and connectivity of the two components, indicating an intergrowth structure. In terms of the electrochemical performance, both cycling stability and rate capability have been significantly improved in the LS-NFM cathode compared to the un-doped NFM control. It maintains a discharge capacity retention of 86% after 100 cycles at a current rate of 100 mA g$^{-1}$ in a potential window of 2-4.2 V, which is much better than that of the NFM control (70% capacity retention). The diffusion coefficient of LS-NFM is 1 order of magnitude higher than that of the NFM at the beginning of the charging process. Moreover, the diffusivity of the LS-NFM during discharge process is also ~1 one order of magnitude higher than that of NFM sample throughout the whole potential window. It explains the superior rate capability of the LS-NFM electrode. The enhanced charge transport kinetics can be explained by the improved ion diffusion through direct channels between the 2D layered and 3D spinel component. The voltage profile of LS-NFM shows a reversible plateau above 4.0 V while the high voltage plateau of the NFM cathode is irreversible, suggesting the enhanced structural and electrochemical stability of LS-NFM cathode by the addition of the spinel phase. We further investigated the origin of the enhanced electrochemical performance in LS-NFM cathode by ex situ XAS. Both hard/soft XAS results suggest that $Ni^{2+}/Ni^{4+}$ and $Fe^{3+}/Fe^{4+}$ redox couple are electrochemically active while $Ni^{2+}/Ni^{4+}$ redox couple contributes to most of the capacity in LS-NFM cathode. Moreover, the XAS results suggest great reversibility of the redox pairs and crystal structure, which presumably is associated with the intergrowth of spinel and layered phase that stabilized the crystal structure above 4.0 V. In addition to the substitution of various transition metals or the modification of the stoichiometry of each transition metal, this study provides a new strategy to improve electrochemical performance of layered cathode materials for sodium ion batteries.

Figure 11:
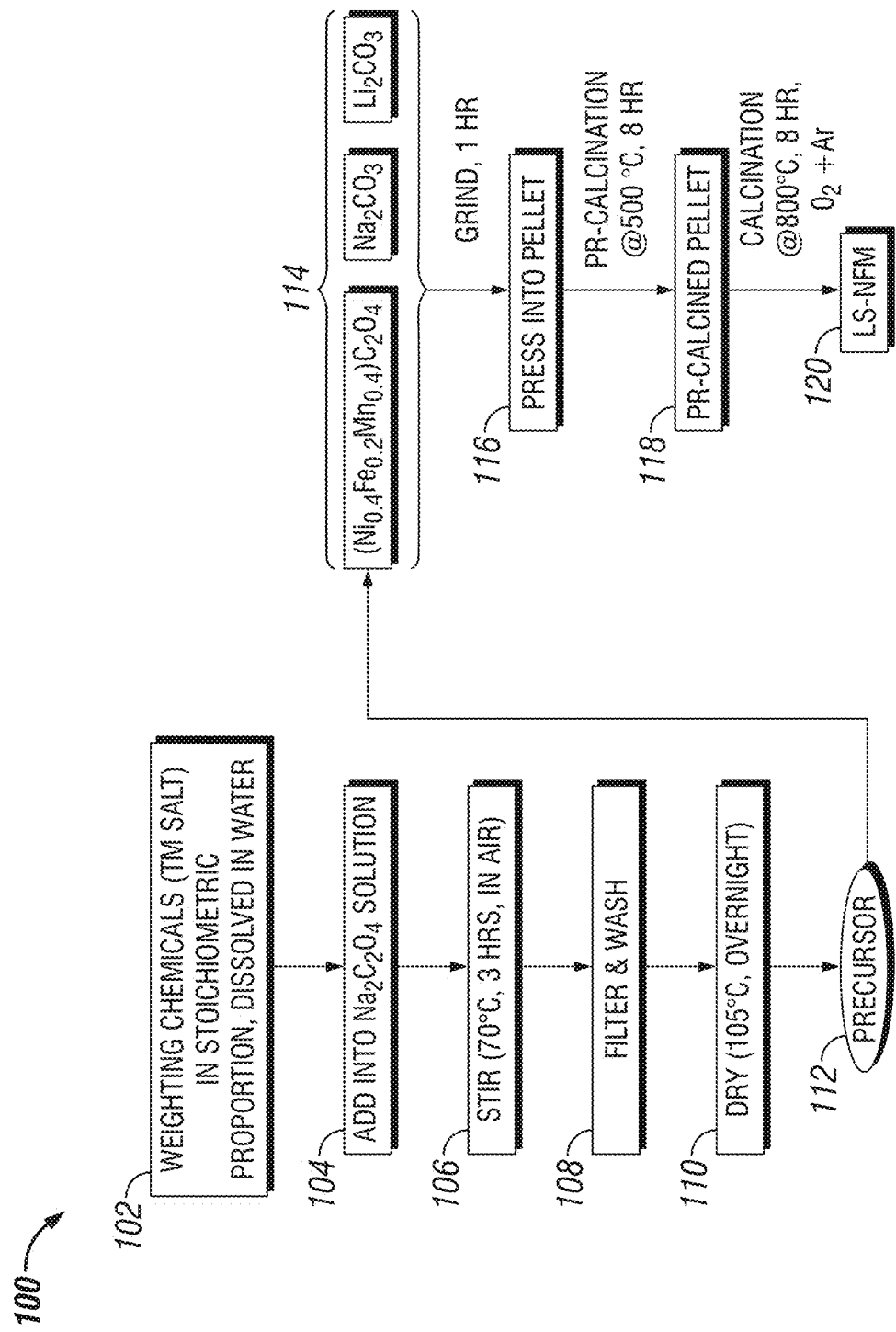
FIG. 11 is a flow chart illustrating methods of manufacture in accordance with disclosed embodiments.

FIG. 11 is a flow chart illustrating methods of manufacture 100 in accordance with disclosed embodiments. As indicated at 102 the process may begin by synthesizing a co-precipitated precursor by dissolving stoichiometric amounts of $NiSO_4 \cdot 6H_2O$, $FeSO_4 \cdot 7H_2O$, and $MnSO_4 \cdot H_2O$ in water to form a first solution. At step 104, adding the first solution into a $Na_2C_2O_4$ solution to form a second solution. At step 106 maintaining the second solution at a substantially constant temperature (e.g., 70° C.) while stirring for a predetermined time period (e.g., 3 hours) while exposed to air. At step 108, filtering the second solution to collect a precipitate and washing the precipitate. At step 110 drying the precipitate (e.g., overnight ~12 hours) at 105° C. to form the co-precipitated precursor as indicated at 112.

At step 114, reacting the co-precipitated precursor 112 comprising $(Ni_{0.4}Fe_{0.2}Mn_{0.4})C_2O_4$, with $Li_2CO_3$ and $Na_2CO_3$ to form a precursor powder. At step 116, grinding the precursor powder (e.g., for 1 hour) together with stoichiometric amounts of $Li_2CO_3$ and $Na_2CO_3$ to form a combined powder and pressing the combined powered into pellets. At step 118 heating the pellets at 500° C. for 8 hours to form PR-calcined pellets. And at step 120, heating the PR-calcined pellets at 800° C. for 8 hours in $O_2$+Ar to form the LS-NFM cathode material.

Although various embodiments have been shown and described, the present disclosure is not so limited and will be understood to include all such modifications and variations would be apparent to one skilled in the art.

What is claimed is:

1. A cathode material for a Sodium Ion Battery (SIB) comprising:
   $Na_{0.87}Li_{0.25}Ni_{0.4}Fe_{0.2}Mn_{0.4}O_{2+\partial}$ (LS-NFM) wherein $0 \leq \partial \leq 0.2$ and wherein the cathode material comprises a dominant layered phase and a secondary spinel phase.

2. The cathode material of claim 1 further comprising:
   94% (by weight) layered components in the dominant layered phase; and
   6% (by weight) spinel components in the secondary spinel phase.

3. The cathode material of claim 1 further comprising:
   a first-cycle Coulombic efficiency of 88%; and
   a reversible discharge capacity of 107 mAh g$^{-1}$ after 50 cycles with the capacity retention of 95% when cycled at a high current density of 100 mA g$^{-1}$.

* * * * *